US009188214B2

(12) United States Patent
Suto et al.

(10) Patent No.: US 9,188,214 B2
(45) Date of Patent: Nov. 17, 2015

(54) MOTOR APPARATUS AND MANUFACTURING METHOD THEREOF

(75) Inventors: Masashi Suto, Kiryu (JP); Yuichi Takamura, Kiryu (JP); Masaki Mita, Kiryu (JP); Hiroyuki Uchimura, Kiryu (JP); Isao Abe, Kiryu (JP); Makoto Ogiwara, Kiryu (JP); Naruhito Ogino, Kiryu (JP); Yukio Okada, Kiryu (JP); Junichi Sekiguchi, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 197 days.

(21) Appl. No.: 13/824,249

(22) PCT Filed: Aug. 22, 2011

(86) PCT No.: PCT/JP2011/068885
§ 371 (c)(1),
(2), (4) Date: May 16, 2013

(87) PCT Pub. No.: WO2012/026430
PCT Pub. Date: Mar. 1, 2012

(65) Prior Publication Data
US 2013/0220073 A1    Aug. 29, 2013

(30) Foreign Application Priority Data

Aug. 23, 2010 (JP) ................................. 2010-186029
Sep. 17, 2010 (JP) ................................. 2010-208764

(51) Int. Cl.
| | |
|---|---|
| *F16H 57/029* | (2012.01) |
| *F16H 1/16* | (2006.01) |
| *F16H 57/031* | (2012.01) |
| *F16H 57/039* | (2012.01) |
| *H02K 5/10* | (2006.01) |
| *H02K 7/116* | (2006.01) |
| *B29C 70/00* | (2006.01) |
| *F16H 57/02* | (2012.01) |

(52) U.S. Cl.
CPC .............. *F16H 57/029* (2013.01); *B29C 70/00* (2013.01); *F16H 1/16* (2013.01); *F16H 57/031* (2013.01); *F16H 57/039* (2013.01); *H02K 5/10* (2013.01); *H02K 7/1166* (2013.01); *F16H 2057/02082* (2013.01); *Y10T 74/2186* (2015.01)

(58) Field of Classification Search
CPC ....... F16H 1/16; F16H 57/029; F16H 57/031; F16H 57/039; H02K 5/10; Y10T 74/2186
See application file for complete search history.

(56) References Cited

U.S. PATENT DOCUMENTS 6,014,915 A *     1/2000  Evans .......................... 74/606 R
2011/0133584 A1*  6/2011  Uchimura ....................... 310/83

FOREIGN PATENT DOCUMENTS

EP    0860573 A2     8/1998
EP    1211434 A2 *   6/2002    ................ F16H 1/16

(Continued)

*Primary Examiner* — Thomas Diaz
(74) *Attorney, Agent, or Firm* — McCormick, Paulding & Huber LLP

(57) ABSTRACT

A seal member is attached to a cover which occludes a gear case as a housing unit. The seal member is formed of elastomer and integrally formed with: a plate-shaped portion formed into a disc shape which covers the inner surface of the cover; an inner seal portion which is positioned on the inner peripheral edge of a through-hole, and comes into sliding contact with the outer peripheral surface of an output member; an outer seal portion which is positioned on the periphery of the cover, and comes into contact with the opening end of the housing unit; and anchor portions which latch onto the front surface of the cover via mounting holes provided to the cover. The boundary between the seal member and the cover extends only to the outside of the gear case, and does not extend to the inside of the gear case.

7 Claims, 14 Drawing Sheets

(56) References Cited

FOREIGN PATENT DOCUMENTS

| JP | S57-60875 | | 4/1982 |
| JP | H04312338 | A | 11/1992 |
| JP | H07336945 | A | 12/1995 |
| JP | 10246060 | A | 9/1998 |
| JP | 11146594 | A | 5/1999 |
| JP | 2002044909 | A | 2/2002 |
| JP | 2010045954 | A | 2/2010 |

* cited by examiner

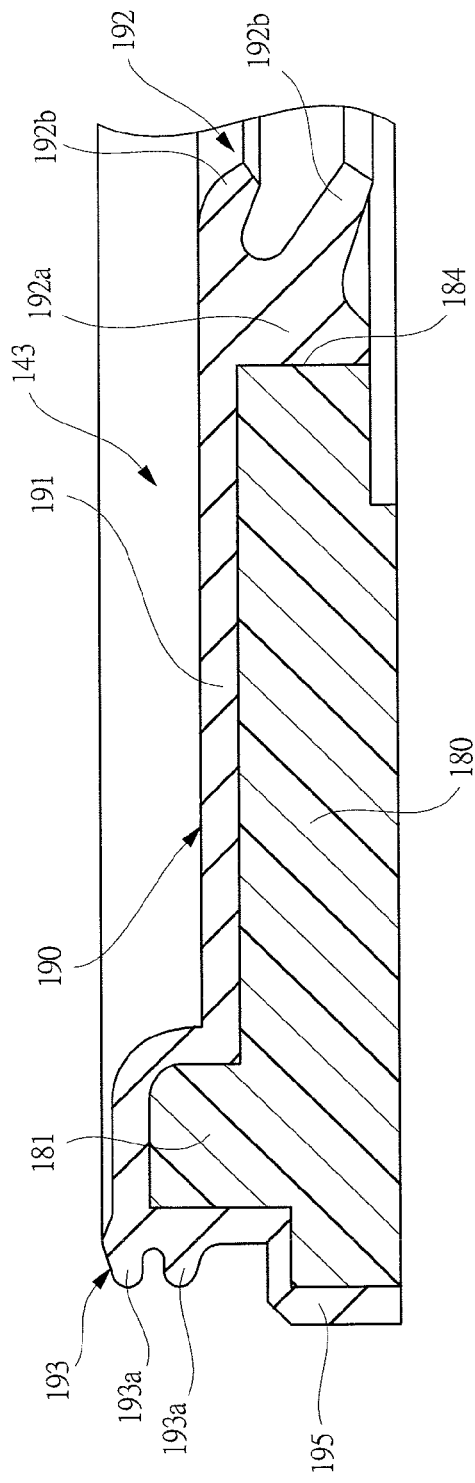
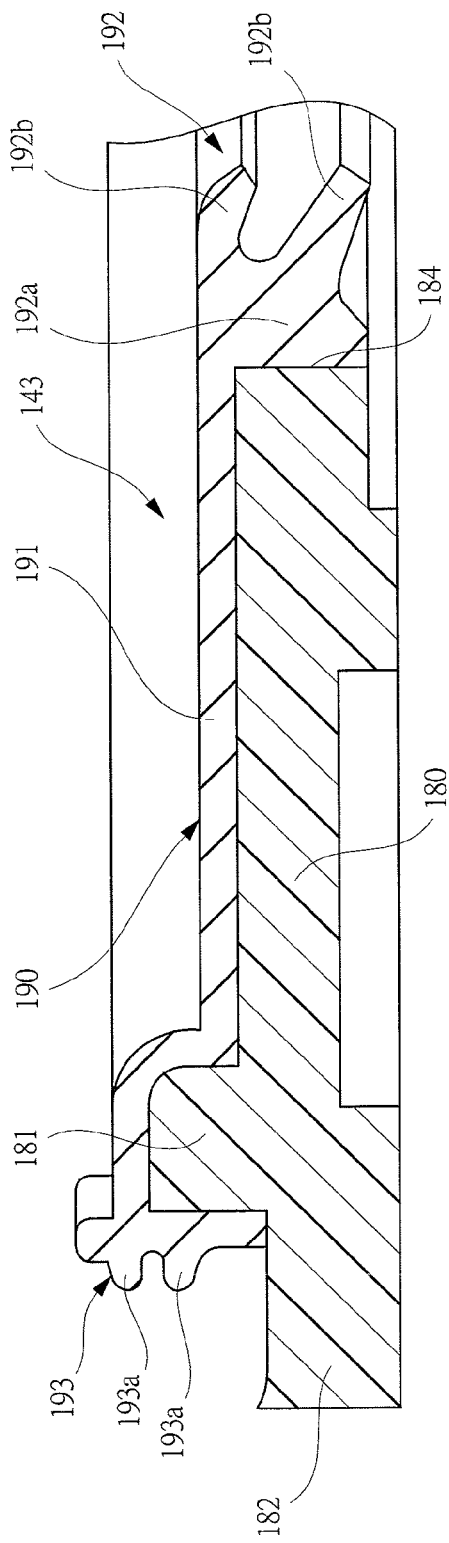

MOTOR APPARATUS AND MANUFACTURING METHOD THEREOF

CROSS REFERENCE TO RELATED APPLICATIONS

This application is entitled to the benefit of and incorporates by reference essential subject matter disclosed in International Patent Application No. PCT/JP2011/068885 filed on Aug. 22, 2011 and Japanese Patent Application Nos. 2010-186029 filed Aug. 23, 2010 and 2010-208764 filed Sep. 17, 2010.

TECHNICAL FIELD

The present invention relates to a motor apparatus formed by coupling a motor case having a rotational shaft housed therein and a gear case having a gear mechanism housed therein with each other, and a method for manufacturing the motor apparatus.

BACKGROUND ART

As a driving source for power-window device, wiper device, sunroof device, and the like, each of which is provided to a vehicle such as automotive vehicle, an electric motor, which is operated by a power supply such as a battery installed in the vehicle, is used in most cases.

In order to adapt the electric motor to these devices, it is necessary to reduce the revolution number of this motor to a predetermined revolution number. For this reason, as the electric motor for use in such applications, conventionally, a motor with speed reduction mechanism (motor apparatus) in which a speed reduction mechanism is attached to an electric motor main body, and which is constituted as one unit, is used.

In the motor with speed reduction mechanism, a gear case is secured to a motor case (yoke) of a motor main body, and the speed reduction mechanism is housed in a bathtub-shaped housing unit formed in a gear case. As the speed reduction mechanism, a worm gear mechanism, which provides a great reduction ratio by using a small-size device, is used in most cases, the rotation of a motor shaft (rotational shaft) is reduced to a predetermined revolution number by the speed reduction mechanism, and transmitted to an output gear. Furthermore, the opening of the housing unit is occluded with a cover, and the output gear protrudes the outside of the gear case via a through hole of the cover.

In this motor with speed reduction mechanism, a sealing structure for occluding the housing unit is provided to a cover so as to prevent water such as rainwater, dusts, and the like from intruding into the gear case.

For example, Japanese Patent Application Laid-Open Publication No. H11-146594 discloses a motor with speed reduction mechanism in which a ring-shaped seal member, which is held in sliding contact with an outer peripheral surface of an output gear, is attached to an inner peripheral edge of a through hole of the cover, and a seal member (O-ring) is placed between an outer peripheral portion of the cover and an opening end of the gear case.

SUMMARY OF THE INVENTION

However, as disclosed in Japanese Patent Application Laid-Open Publication No. H11-146594, since the seal members are respectively provided to the inner peripheral edge of the through hole of the cover and the outer peripheral surface of the output gear, a boundary between the seal member and the cover is formed so as to extend from the outside of the cover to the inside, water may intrude into the inside of the gear case via the boundary between the seal member and the cover.

An object of the present invention is to provide a motor apparatus and a manufacturing method which prevents rainwater and the like from intruding into a gear case.

In a motor apparatus according to the present invention, which is formed by coupling a motor case having a rotational shaft housed therein and a gear case having a gear mechanism housed therein with each other, the motor apparatus comprises: a gear cover which occludes an opening of the gear case, the gear cover having a center portion formed with a through hole, an output shaft being introduced through the through hole; and a seal member which is provided on one side surface of the gear cover, wherein the seal member has: a flat-plate main body which covers one side surface of the gear cover, a first lip portion which is provided to an inner peripheral edge of the flat-plate main body so as to tightly seal a gap between the gear cover and the output shaft, and a second lip portion which is provided to an outer peripheral edge of the flat-plate main body so as to tightly seal a gap between the gear cover and the gear case.

In the motor apparatus according to the present invention, the gear cover is integrally provided with the seal member by a two-color molding, the flat-plate main body is integrally provided with a gate portion which is formed by supplying molten rubber to one side surface of the gear cover in a vertical direction, and an overflow portion, which extends from one side surface of the gear cover to the other side surface of the gear cover, is provided at a collision area of the flat-plate main body, at which flows of molten rubber collide to each other.

In the motor apparatus according to the present invention, at least one of the first lip portion and the second lip portion is formed by multistory lip segments aligned in an axial direction of the output shaft.

In the motor apparatus according to the present invention, the seal member has an anchor portion which latches onto the other side surface of the gear cover via a mounting hole of the gear cover.

In the motor apparatus according to the present invention, the gear cover has a stopping claw for securing the gear cover to the gear case.

A method for manufacturing a motor apparatus of the present invention, which is formed by coupling a motor case having a rotational shaft housed therein and a gear case having a gear mechanism housed therein with each other, the method comprising: a first step of allowing a first mold and a second mold to abut on each other, and supplying molten resin to a hollow portion formed between the first mold and the second mold, the first mold molding one side surface of a gear cover which occludes an opening of the gear case, the gear cover having a center portion formed with a through hole through which an output shaft is introduced, the second mold molding the other side surface of the gear cover; a second step of separating only the first mold from the gear cover formed in the first step with the gear cover being attached to the second mold; a third step of allowing a third mold for molding one side surface of a seal member to abut on the second mold with the gear cover being attached to the second mold, and supplying molten resin to a hollow portion formed between the second mold and the third mold, the seal member having a ring-shaped flat-plate main body provided to one side surface of the gear cover, a first lip portion provided to an inner peripheral edge of the flat-plate main body so as to tightly seal a gap between the gear cover and the output shaft, and a second lip portion provided to an outer peripheral edge of the flat-plate main body so as to tightly seal a gap between the gear cover and the gear case; and a fourth step of separating the second mold and the third mold from each other, and allowing the gear cover integrally formed with the seal member to be detached from the second mold and the third mold.

In the method for manufacturing the motor apparatus of the present invention, in the third step, by supplying molten rubber to one side surface of the gear cover in a vertical direction, a gate portion is formed on the flat-plate main body, and an overflow portion extending from one side surface of the gear cover to the other side surface is formed at a collision area of the flat-plate main body, at which flows of molten rubber collide to each other.

In the method for manufacturing the motor apparatus of the present invention, the first lip portion is molded by the abutting portion between the second mold and the third mold.

In the method for manufacturing the motor apparatus of the present invention, the third mold is composed of a first split mold and a second split mold, and the second lip portion is molded by an abutting portion between the first split mold and the second split mold.

In accordance with the present invention, since the boundary between the seal member attached to one side surface of the gear cover and the gear cover continues only to the outside of the gear case, and does not continue to the inside of the gear case. Therefore, it is possible to positively prevent water such as rainwater or the like from intruding into the gear case via the boundary between the seal member and the gear cover.

Furthermore, in accordance with the present invention, since the boundary between the seal member and the gear cover is connected only to the outside of the gear case, with no connection being made to the inside of the gear case, it is possible to positively prevent water such as rainwater or the like from intruding into the gear case, without the necessity of making the seal member tightly in contact with the gear cover by using an adhesive or the like. Therefore, by using a simple structure in which an anchor portion is engaged and latches onto the surface side of the gear cover via a mounting hole so as to attach the seal member to the gear cover, it is possible to positively prevent water such as rainwater or the like from intruding into the gear case, and consequently to reduce the costs of the motor apparatus.

Furthermore, in accordance with the present invention, since the seal member is integrally provided on one side surface of the gear cover by using a two-color molding process, the sealing structure can be formed by using the gear cover (two members in total) integrally formed with the seal member, so that a simple structure is achieved by eliminating the assembling job.

In accordance with the present invention, the seal member has a ring-shaped flat-plate main body, a first lip portion which is formed on an inner peripheral edge of the flat-plate main body and tightly seals a gap between the gear cover and the output shaft, and a second lip portion which is formed on an outer peripheral edge of the flat-plate main body and tightly seals a gap between the gear cover and the gear case, and a gate portion, which is formed by supplying a molten rubber on one side surface of the gear cover in a vertical direction, is installed on the flat-plate main body, with an overflow portion which extends from one side surface of the gear cover toward the other side surface being installed at a collision portion at which the molten rubber flows collide with each other of the flat-plate main body; therefore, at the collision portion at which the molten rubber flows collide with each other, it is possible to direct the molten rubber to the other side surface of the gear cover beyond the lip portion.

With this configuration, it is possible to suppress a welded portion from occurring at the collision portion of the molten rubber flows on the periphery of the lip portion, and consequently to improve the sealing performance of the seal member.

In accordance with the present invention, at least one of the first lip portion and the second lip portion is formed by multistory lip segments aligned in an axial direction of the output shaft; therefore, even in the case when a welded portion occurs on the periphery of the lip portion, a normal lip segment without having the welded portion among the plural lip segments makes it possible to prevent a defective sealing state from occurring.

Furthermore, in accordance with the method for manufacturing the motor apparatus of the present invention, in the third step, since the gear cover formed in the first step is not removed from the second mold so that the gear cover is kept in an attached thereto, it is possible to simplify the molding process. Furthermore, since the gear cover is kept held in the second mold from the first step to the third step, it is possible to regulate a deformation of the gear cover due to cooling by the second mold and consequently to improve the molding precision of the gear cover. Thus, in the third step, the gear cover and the seal member can be fused and deposited with sufficient strength so that the molding precision is improved and the occurrence of deviations can be suppressed.

Furthermore, in accordance with the method for manufacturing the motor apparatus of the present invention, since the first lip portion is molded by using an abutting portion between the second mold and the third mold, air (Air) located inside the hollow portion can be discharged outside through the abutting portion between the second mold and the third mold so that the first lip portion is prevented from being formed into a defective shape and it is possible to form the first lip portion with high precision.

Furthermore, in accordance with the method for manufacturing the motor apparatus of the present invention, since the third mold is formed by a first split mold and a second split mold, and since the second lip portion is molded by using an abutting portion between the first split mold and the second split mold, air (Air) located inside the hollow portion can be discharged outside through the abutting portion between the first split mold and the second split mold, and the second lip portion is prevented from being formed into a defective shape, so that the second lip portion can be molded with high precision.

BRIEF DESCRIPTION OF THE DRAWINGS

FIG. 9A is a sectional view taken along a line D-D of FIG. 8B;

FIG. 9B is a sectional view taken along a line E-E of FIG. 8B;

DESCRIPTION OF THE PREFERRED EMBODIMENTS

Hereinafter, embodiments of the present invention will be explained in detail with reference to the accompanying drawings.

Figure 1:
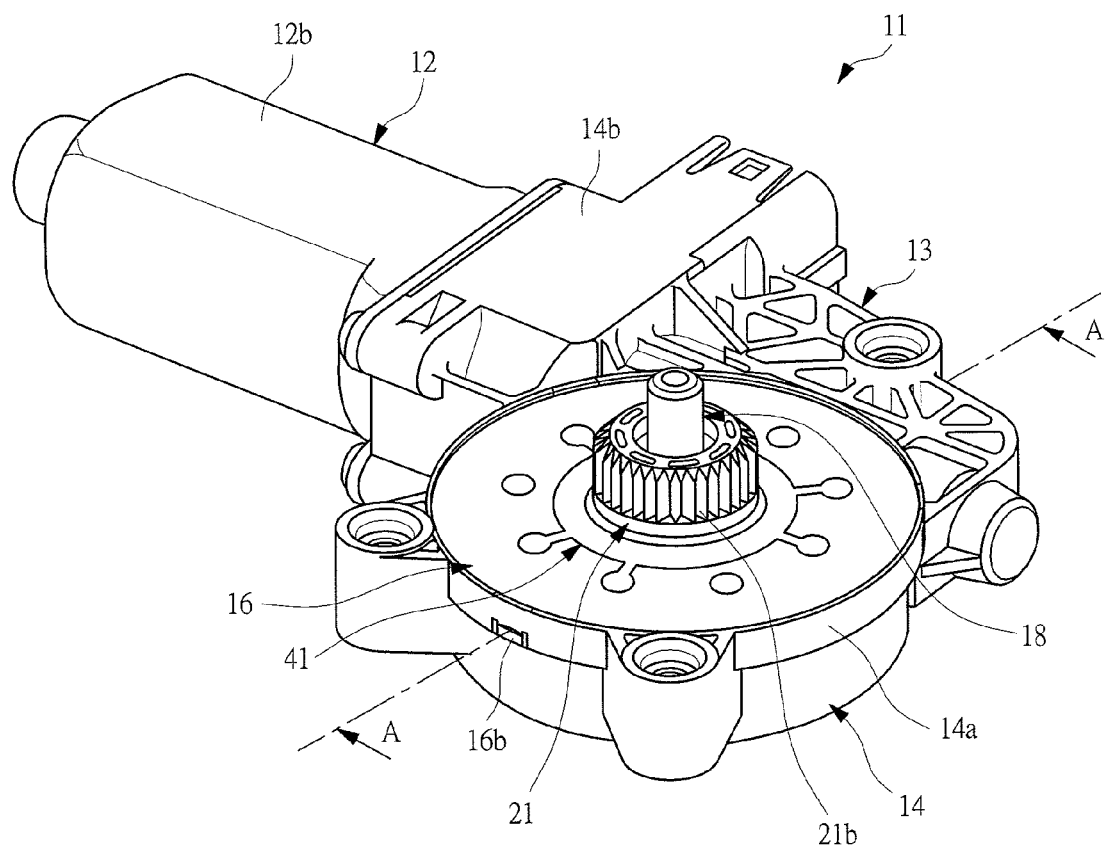
FIG. 1 is a perspective view of a power-window motor according to one embodiment of the present invention.
Figure 2:
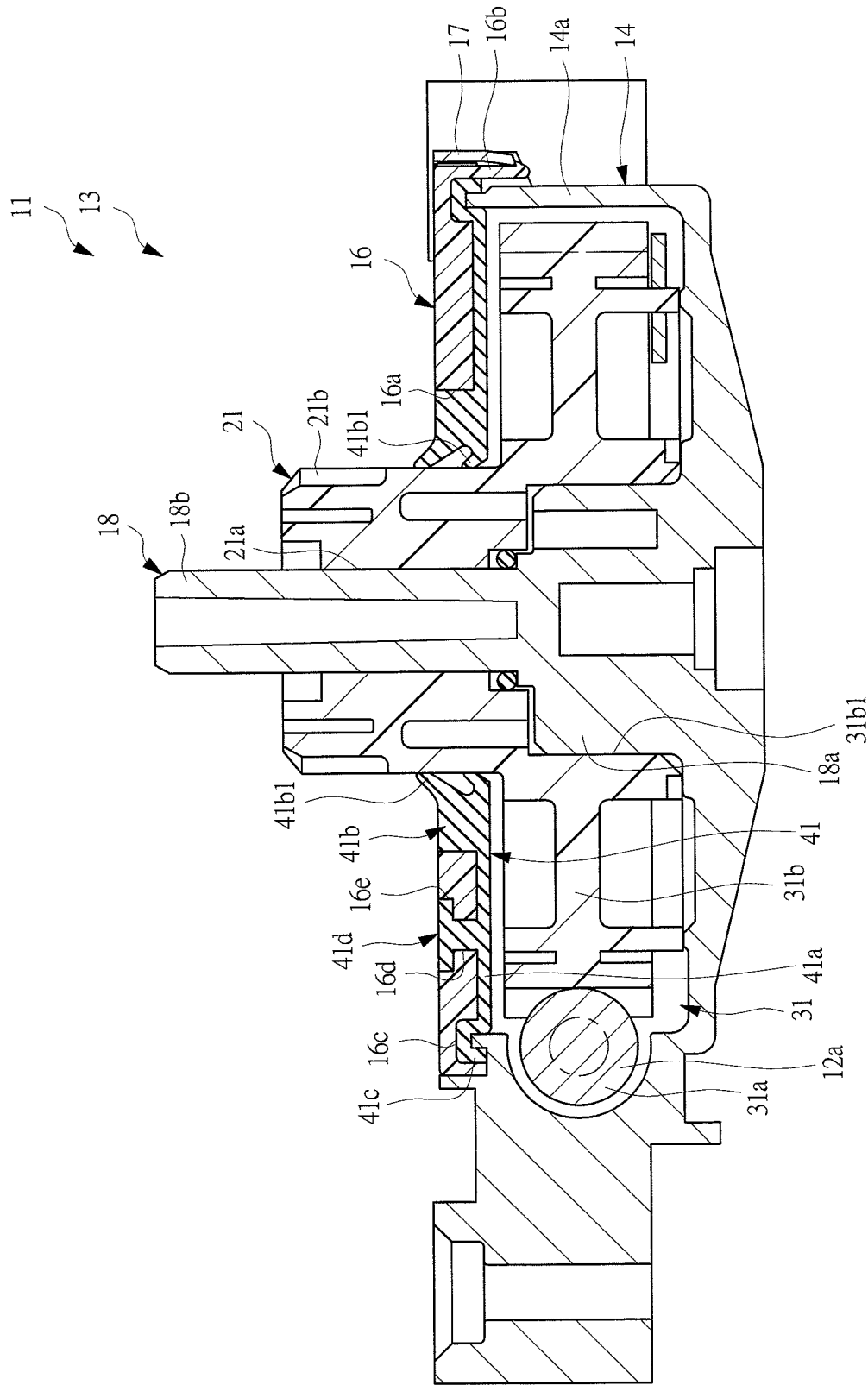
FIG. 2 is a sectional view taken along a line A-A of FIG. 1.

A power-window motor 11 serving as a motor apparatus shown in FIG. 1 is used as a driving source for a power-window apparatus to be installed in a vehicle such as automotive vehicle, and configured to drive a window glass of the vehicle via a regulator so as to automatically open and close it.

This power-window motor 11 is provided with a motor main body 12 and a reducer 13, and the reducer 13 is attached to the motor main body 12 so that they are formed as one unit.

The motor main body 12 constitutes an electric motor with brush, and its motor shaft 12a (rotational shaft) is allowed to rotate in both forward and reverse rotation directions.

On the other hand, the reducer 13 is provided with a gear case 14 made of aluminum alloy. The gear case 14, provided with a housing unit 14a and a motor attaching unit 14b, is attached to an opening end of a yoke 12b serving as a motor case of the motor main body 12 at the motor attaching unit 14b. The housing unit 14a is formed into a bottomed cylinder shape with opening on its one side, that is, into a substantially circular bathtub shape, and its opening is closed by a cover 16 serving as a gear cover.

Figure 3:
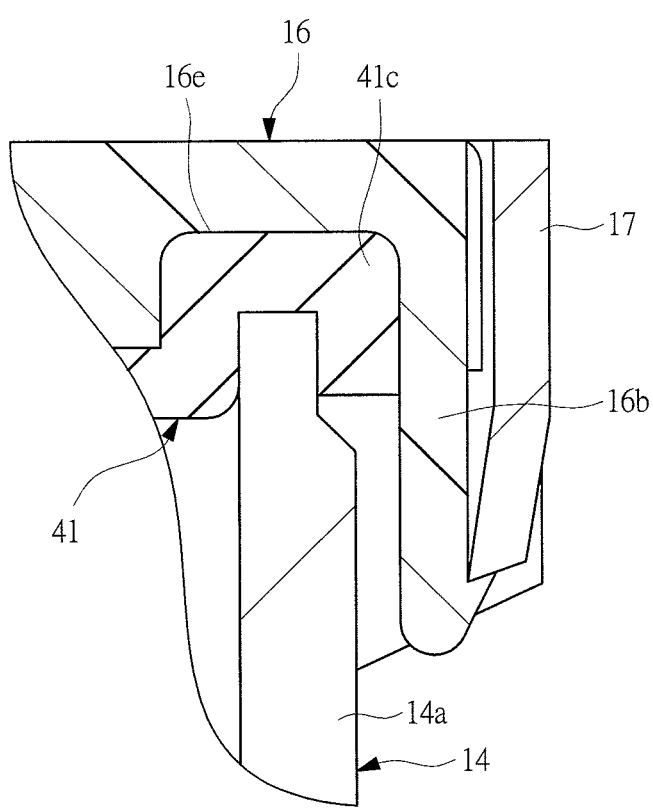
FIG. 3 is an enlarged sectional view showing a fixed structure of a cover to a gear case.

The cover 16 is formed into a substantially disc shape by using resin material, and its shaft center (center portion) is formed with a through hole 16a. Furthermore, the outer peripheral portion of the cover 16 is provided with three stopper claws 16b which are aligned side by side at regular intervals in its circumferential direction, as shown in FIG. 3, the cover 16 is securely fixed to the gear case 14 by attaching the cover 16 to the gear case 14, and by engaging the stopper claws 16b with respective stopping segments 17 formed on the outer peripheral portion of the housing unit 14a of the gear case 14.

On the bottom of the housing unit 14a of the gear case 14, the housing unit 14a is integrally provided with a support shaft 18, and axially aligned with the support shaft 18. The support shaft 18 protrudes from the bottom of the housing unit 14a toward the outside of the gear case 14 in the axial direction, and provided with: a large diameter portion 18a on its base end side, and a small diameter portion 18b smaller in diameter than the large diameter portion 18a on its tip end side.

An output member 21 serving as an output shaft is attached to the small diameter portion 18b of the support shaft 18. The output member 21 is formed into a cylinder shape by using resin material, and is supported by the small diameter portion 18b via a mounting hole 21a formed in its shaft center, and is also rotatably supported by the support shaft 18 with its end portion in the axial direction being made in contact with the end portion in the axial direction of the large diameter portion 18a. Furthermore, the base end portion formed as one end side in the axial direction of the output member 21 is accommodated in the housing unit 14a, and the tip end portion formed as the other end side in the axial direction is allowed to protrude outside the gear case 14 via the through hole 16a of the cover 16. In the output member 21, the portion protruding outside the gear case 14 is provided with a gear unit 21b which is integrally formed on its outer peripheral surface to be configured as a pinion gear, and by allowing this gear unit 21b to be meshed with the driving gear of a regulator (not shown) formed inside a door of the vehicle, the output of the power-window motor 11 is transmitted to the regulator.

In addition, in the drawing, the output member 21 is integrally provided with the gear unit 21b, it is not limited to this structure, a gear unit 21b may be formed as one part which is not included in the output member 21, and securely fixed to the output member 21.

In order to decelerate the rotation of the motor shaft 12a to transmit the reduced rotation to the output member 21, a speed reduction mechanism 31 serving as a gear mechanism is accommodated in the housing unit 14a of the gear case 14. As this speed reduction mechanism 31, a worm gear mechanism, provided with a worm 31a and a worm wheel 31b meshed with the worm 31a, is used.

The tip end side of the motor shaft 12a protrudes from the yoke 12b, and is accommodated in the housing unit 14a of the gear case 14, and the worm 31a is integrally formed on the outer peripheral surface of the portion of the motor shaft 12a accommodated in the housing unit 14a.

On the other hand, the worm wheel 31b is formed into a ring shape by using resin material, and has a diameter slightly smaller than the inner diameter of the housing unit 14a, and the worm wheel 31b is attached to the large diameter portion 18a of the support shaft 18 via a mounting hole 31b1 formed in its shaft center. With this configuration, the worm wheel 31b is rotatable around the support shaft 18 in the housing unit 14a. Furthermore, the worm wheel 31b is integrally formed with the output member 21 so as to be rotated together with the output member 21.

In this configuration, when the motor main body 12 is activated so as to rotate the motor shaft 12a, the rotation is decelerated to a predetermined number of revolutions by the worm 31a and the worm wheel 31b, and the reduced rotation is outputted from the output member 21.

In addition, in the drawings, the output member 21 and the worm wheel 31b are integrally formed with each other by using resin material; however, it is not limited to this structure, the output member 21 and the worm wheel 31b may be formed separately, and coupled with each other by using a coupling mechanism so as to form a power transmission mechanism.

In order to prevent water, such as rainwater or the like, from entering into the gear case 14, a seal member 41 is attached to the cover 16.

Figure 4A:
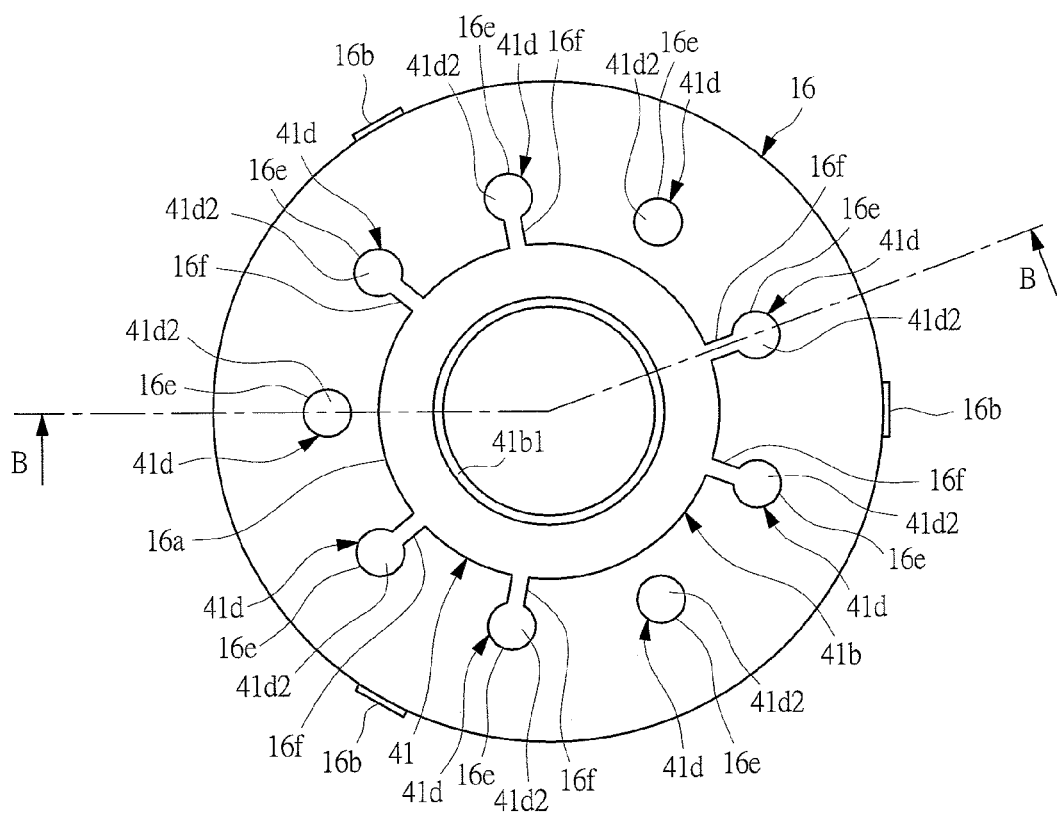
FIG. 4A is a plan view showing a detail of the gear cover.
Figure 4B:
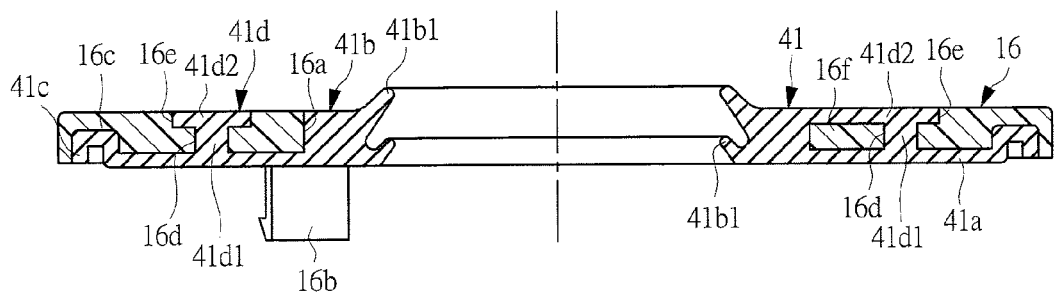
FIG. 4B is a sectional view taken along a line B-B of FIG. 4A.

The seal member 41 is made of elastomer such as synthetic rubber, and as shown in FIG. 4, the seal member 41 is integrally formed with: a plate-shaped portion 41a serving as a flat-plate main unit; an inner seal portion 41b serving as a first lip portion; and an outer seal portion 41c serving as a second lip portion.

The plate-shaped portion 41a is formed into a disc shape, and substantially the same in shape as an inner surface of the cover 16, that is, a surface directed toward the inner part of the gear case 14 with the cover 16 being attached to the gear case 14, and the plate-shaped portion 41a is disposed on one surface as the inner surface of the cover 16 so as to cover all the inner surface.

The inner seal portion 41b is formed into an annular shape, and is disposed along an inner peripheral edge of the through hole 16a of the cover 16 so as to make its outer peripheral surface abut on the inner peripheral edge. On the inner peripheral surface of the inner seal portion 41b, a pair of lips 41b1 is disposed side by side in the axial direction. Each of the lips 41b1 protrudes inward in the radial direction, and has an inner diameter slightly smaller than the outer diameter of the output member 21. Each of the lips 41b1 is kept in sliding contact with an outer peripheral surface between a gear portion and a base end portion, in such a state as to be slightly deformed elastically outward in the radial direction. With this configuration, the gap between the through hole 16a of the cover 16 and the output member 21 is tightly closed by the inner seal portion 41b so that water, such as rainwater or the like, is prevented from entering through the gap between the through hole 16a and the output member 21.

The outer seal portion 41c is formed into a ring shape along the outer peripheral portion of the plate-shaped portion 41a, with its cross-section in the radial direction being formed into a U-letter shape having an opening toward the housing unit 14a, and is fitted into a concave portion 16c formed along the outer peripheral portion of the inner surface of the cover 16, and disposed on the outer peripheral portion of the cover 16. The outer seal portion 41c allows the opening end of the housing unit 14a to be engaged with the inside of its U-letter shape, and is made in contact with the opening end. With this configuration, the combined section between the outer peripheral portion of the cover 16 and the opening end of the housing unit 14a is tightly closed by the outer seal portion 41c, it is possible to prevent water, such as rainwater or the like, from entering through the combined section between the outer peripheral portion of the cover 16 and the opening end of the housing unit 14a.

The seal member 41 is provided with nine anchor portions 41d for fixing the seal member 41 to the cover 16.

On the cover 16, nine mounting holes 16d which is introduced through this in the axial direction are formed in the circumferential direction side by side with equal intervals, and when respective anchor portions 41d are secured to the surface side of the cover 16, that is, the gear case 14, through the corresponding mounting holes 16d, they are engaged with and stopped onto a surface which faces the side opposite to the housing unit 14a so that the seal member 41 is secured to the cover 16. That is, each anchor unit 41d is provided with a leg portion 41d1 which protrudes from the plate-shaped portion 41a in the axial direction and a stopping portion 41d2 which is integrally formed onto the tip of the leg portion 41d1, and the leg portion 41d1 is inserted into the mounting hole 16d of the cover 16, with the stopping portion 41d2, formed into a disc shape having a diameter larger than the mounting hole 16d, being engaged with the surface side of the cover 16. With this configuration, the seal member 41 is secured to the cover 16, with the cover 16 being sandwiched between the stopping portion 41d2 and the plate-shaped portion 41a.

Additionally, a concave portion 16e is formed on the surface side of the cover 16 in association with the stopping portion 41d2 so that when the stopping portion 41d2 is disposed on the corresponding concave portion 16e, the surface side of the cover 16 and the stopping portion 41d2 are formed on the same plane.

Each of the six mounting holes 16d except for the three mounting holes 16d which are mutually aligned side by side in the circumferential direction with intervals of 120 degrees is placed continuously along the inner peripheral edge of the through hole 16a of the cover 16 by each of grooves 16f respectively formed on the surface side of the cover 16. The stopping portion 41d2 of each of the anchor portions 41d in association with the six mounting holes 16d extends to the inner peripheral edge of the cover 16 along the groove 16f, and connected to the outer peripheral portion of the inner seal portion 41b. Thus, the inner seal portion 41b is supported by the plate-shaped portion 41a and the stopping portion 41d2, and is positively disposed on the inner peripheral edge of the through hole 16a of the cover 16.

Figure 5A:
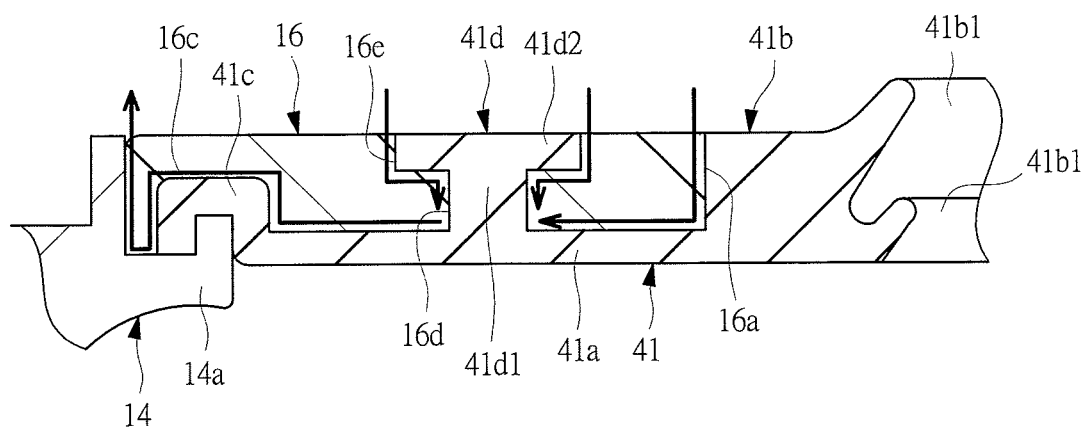
FIGS. 5A and 5B are views each explaining a flow of water between a seal material and the gear cover.
Figure 5B:
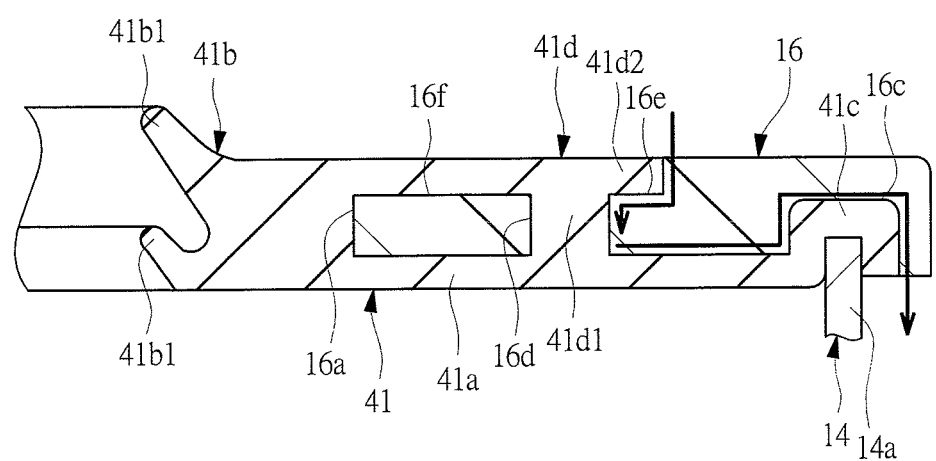

As explained above, the seal member 41 for use in the power-window motor 11 of the present invention has such a structure which the plate-shaped portion 41a covering the inner surface of the cover 16 and the inner seal portion 41b which is disposed on the inner peripheral edge of the through hole 16a of the cover 16 so as to be made in sliding contact with the outer peripheral surface of the output member 21 are integrally formed; therefore, as shown in FIG. 5A, even when rainwater or the like invades through a boundary between the inner peripheral edge of the through hole 16a of the cover 16 and the inner seal portion 41b, the intruding water is directed to the outer peripheral portion of the cover 16 through the boundary between the inner surface of the cover 16 and the plate-shaped portion 41a of the seal member 41, and is further discharged outside the opening end of the housing unit 14a, that is, outside the gear case 14, passing through a boundary between the outer seal portion 41c which is in contact with the opening end of the housing unit 14a and the cover 16. Furthermore, even when rainwater or the like invades through a boundary between the stopping portion 41d2 of the anchor portion 41d and the cover 16, the water is allowed to reach a boundary between the inner surface of the cover 16 and the plate-shaped portion 41a of the seal member 41 via the boundary between the leg portion 41d1 and the mounting hole 16d, and from this position, is further discharged outside the gear case 14 in the same manner as the above. Furthermore, as shown in FIG. 5B, with respect to each portion on which the groove 16f is formed on the cover 16 as well, water such as rainwater or the like intruding through a boundary between the stopping portion 41d2 of the anchor portion 41d and the cover 16 is allowed to reach the boundary between the inner surface of the cover 16 and the plate-shaped portion 41a of the seal member 41 via the boundary between the leg portion 41d1 and the mounting hole 16d, and from this position, is discharged outside the gear case 14.

In this manner, in this power-window motor 11, the boundary between the seal member 41 attached to the cover 16 and the cover 16 is connected only to the outside of the gear case 14, with no connection being made to the inside of the gear case 14 so that even when water such as rainwater or the like invades through the boundary between the seal member 41 and the cover 16, no water is transmitted through the boundary to invade to the inside of the gear case 14. Therefore, it is possible to positively prevent water such as rainwater or the like from intruding to the inside of the gear case 14.

Furthermore, in this power-window motor 11, since water such as rainwater or the like, intruding through the boundary between the seal member 41 and the cover 16, is prevented from reaching the inside of the gear case 14 through the boundary, it is possible to positively prevent water such as rainwater or the like from intruding to the inside of the gear case 14, without the necessity of making the seal member 41 tightly in contact with the cover 16 by using an adhesive or the like. Therefore, with respect to the structure for securing the seal member 41 to the cover 16, by using a simple structure in which, without using an adhesion structure by the use of an adhesive, the anchor portion 41*d* is engaged and latches onto the surface side of the cover 16, costs of the power-window motor 11 can be reduced.

Figure 6:
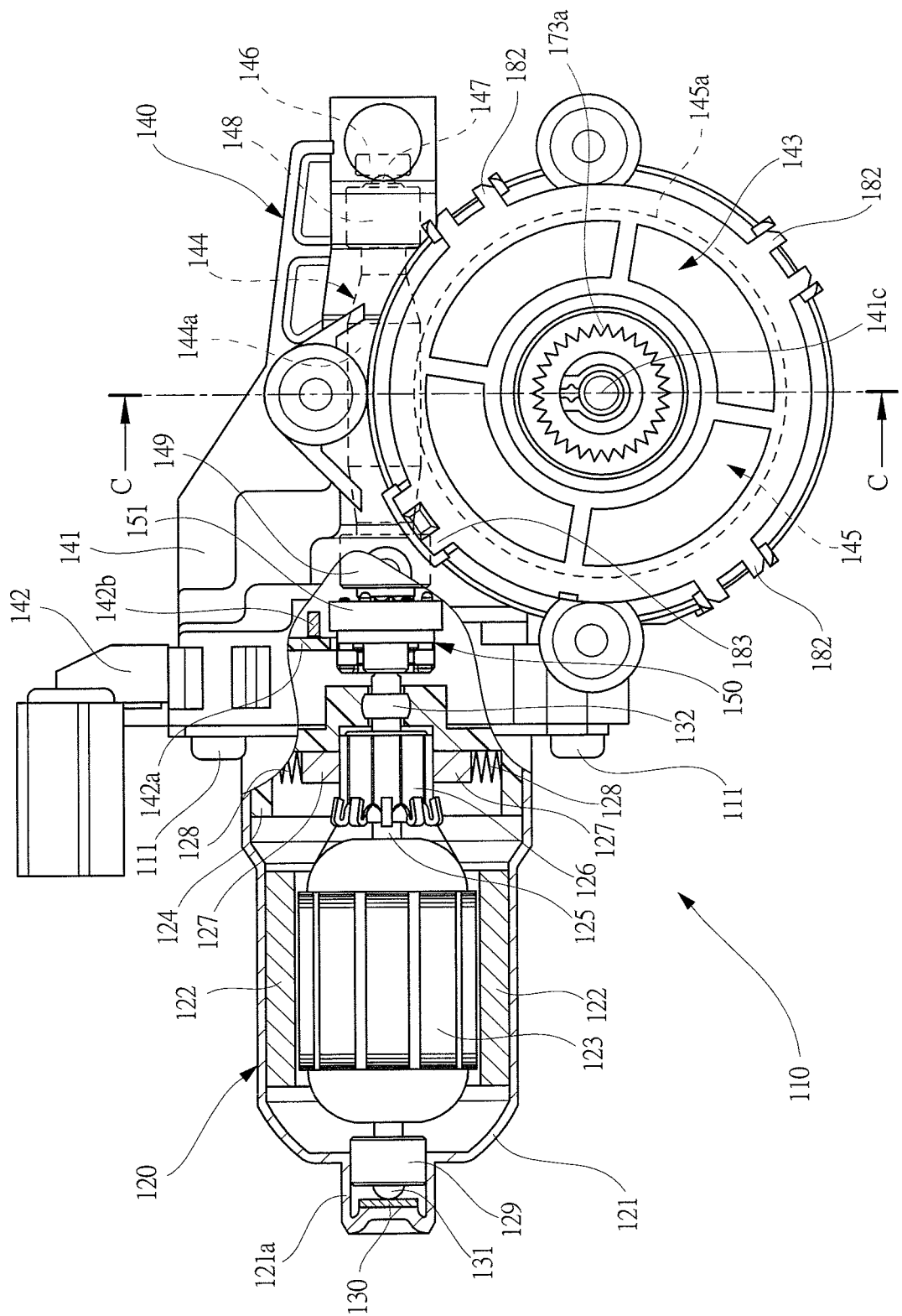
FIG. 6 is a fragmentary sectional view showing a motor with reduction mechanism according to the second embodiment of the present invention.
Figure 7:
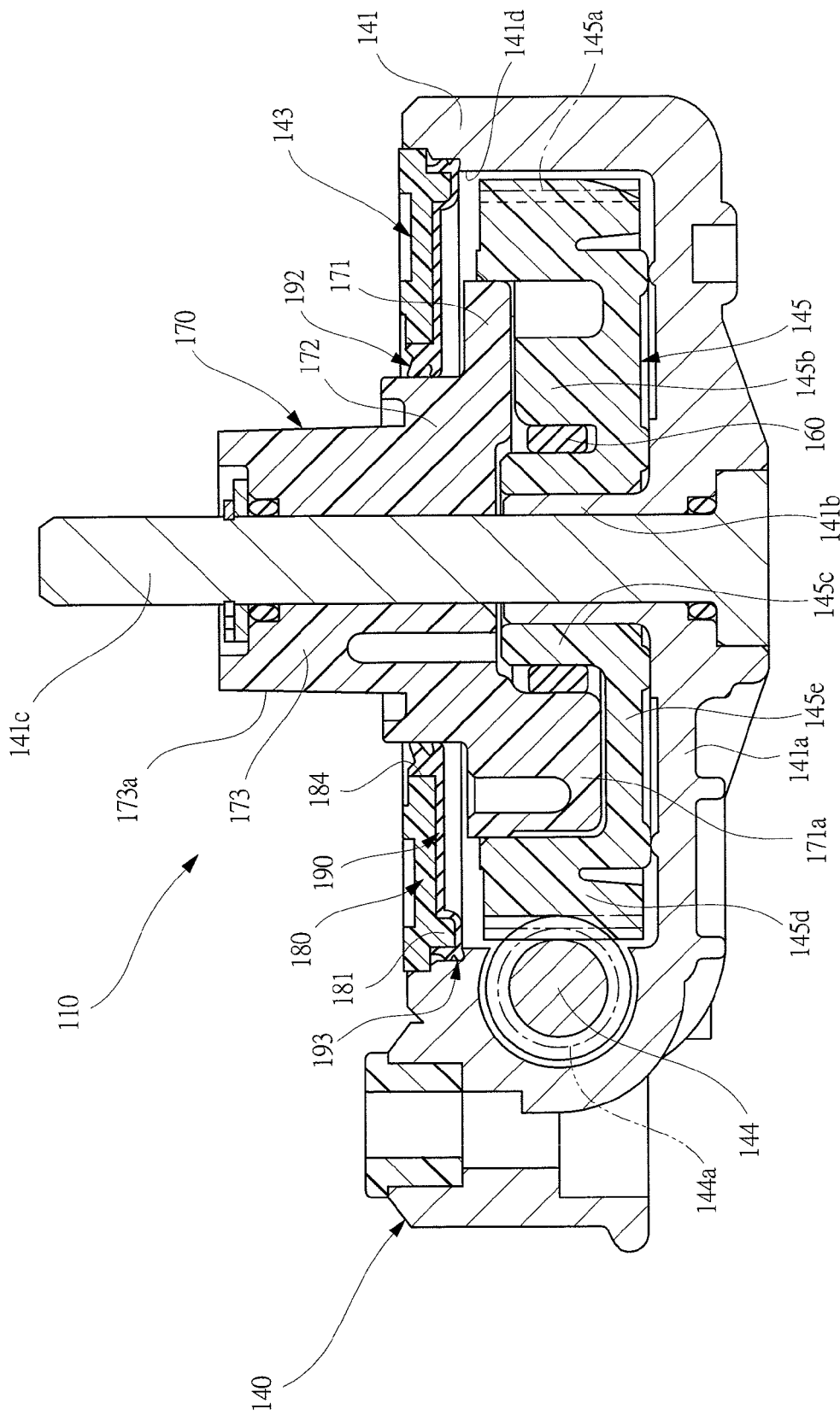
FIG. 7 is a sectional view taken along a line C-C of FIG. 6.
Figure 8A:
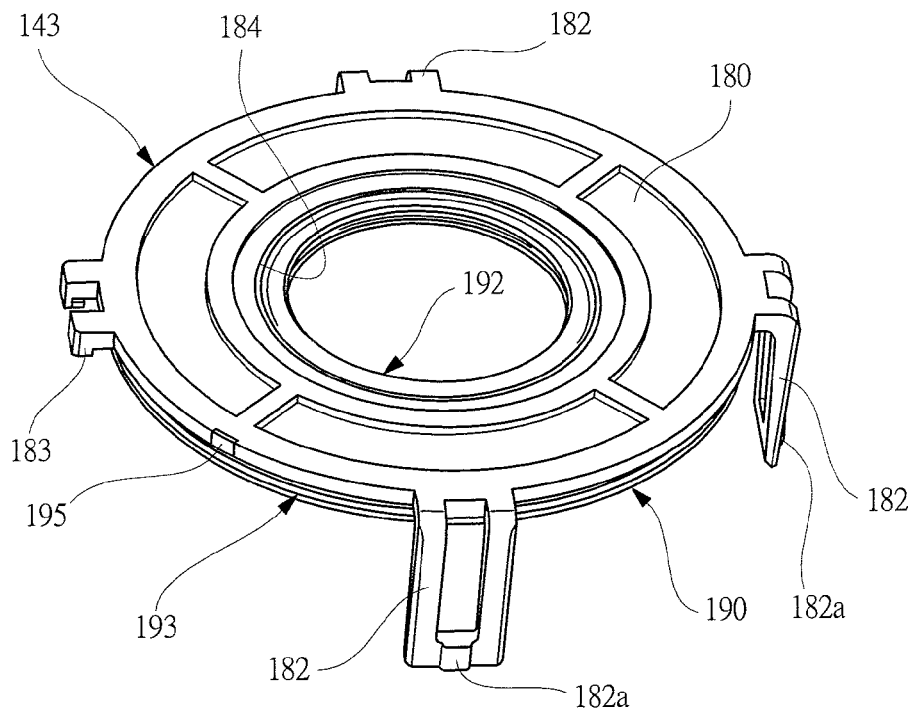
FIGS. 8A and 8B are perspective view each showing a bottom cover according to the second embodiment.
Figure 8B:
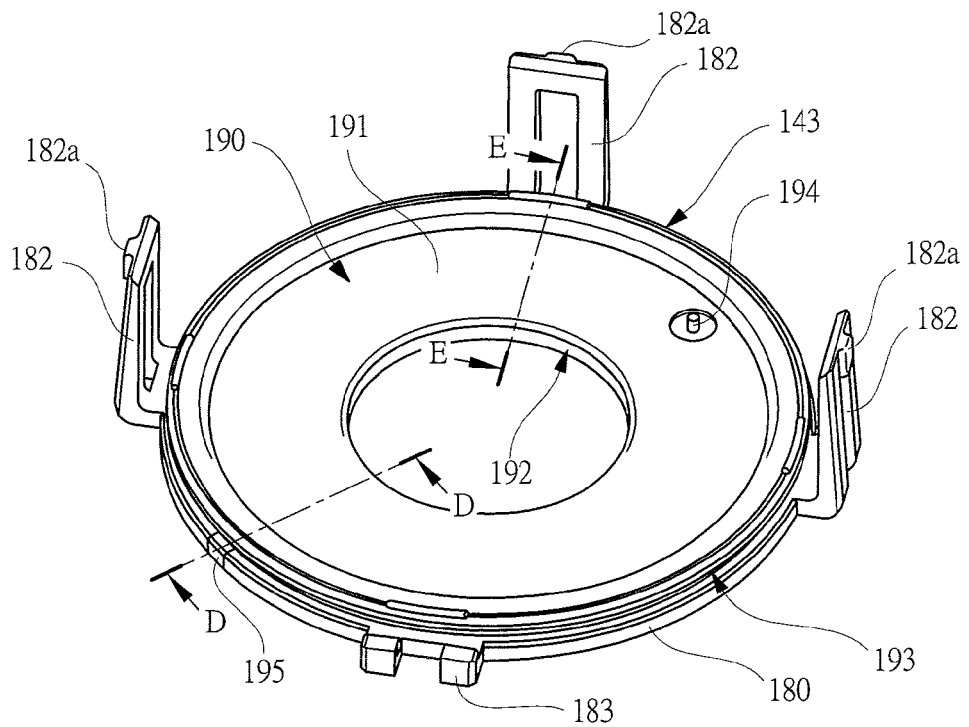

FIG. 6 is a fragmentary sectional view showing a motor with reduction mechanism according to the second embodiment of the present invention, FIG. 7 is a sectional view taken along a line C-C of FIG. 6, FIGS. 8A and 8B are perspective views each showing a bottom cover according to the second embodiment, FIG. 9A is a sectional view taken along a line D-D of FIG. 8B, and FIG. 9B is a sectional view taken along a line E-E of FIG. 8B.

As shown in FIG. 6, the motor 110 with speed reduction mechanism, which serves as a motor apparatus in a second embodiment of the present invention, is used as a power source for a power-window apparatus (not shown) to be installed in a vehicle such as automotive vehicle, and configured to drive a window glass of the vehicle via a regulator so as to automatically open and close it. Since the motor 110 with speed reduction mechanism is installed in a narrow space (not shown) formed in the door of a vehicle, it is formed into a flat shape as shown in FIG. 7. The motor 110 with speed reduction mechanism has a motor section 120 and a gear section 140, and the motor section 120 and the gear section 140 are coupled to each other (formed into one unit) by using a plurality of fastening screws 111 (two in the drawings).

The motor section 120 has a motor case 121 which is formed into a bottomed cylindrical shape by a press working (deep drawing) of a steel plate made of magnetic material. In the motor case 121, a plurality of magnets 122 (two in the drawings), each of which has a substantially arc shape in its cross section, is securely fixed, and on the inner side of the magnets 122, an armature 123, which has coils (not shown) wound around it, is accommodated, spaced from them by a predetermined gap, and rotatable. Furthermore, a brush holder 124 is attached to the opening side (right side in the drawing) of the motor case 121, and the opening side of the motor case 121 is closed by this brush holder 124.

An armature shaft 125 serving as a rotation shaft is introduced through the rotation center of the armature 123, and secured to it. A commutator 126 is provided in the vicinity of the armature 123 on the armature shaft 125, and ends of the coils wound around the armature 123 are electrically connected to this commutator 126. A pair of brushes 127 held by a brush holder 124 are in sliding contact with the outer peripheral portion of the commutator 126, and each of the brushes 127 elastically contacts the commutator 126 with a predetermined pressure being applied by a spring member 128 toward the commutator 126. With this configuration, by supplying a driving current to each brush 127 from a controller (not shown), a rotational force (electromagnetic force) is generated in the armature 123, and consequently, the armature shaft 125 is rotated at a predetermined number of revolutions and a rotational torque.

A bottom side (left side in the drawing) of the motor case 121 is formed into a stepped shape, and provided with a bottomed cylindrical portion 121*a* which is smaller in diameter than the main body portion of the motor case 121. A first radial bearing 129 is attached to the bottomed cylindrical portion 121*a*, and rotatably supports one side (left side in the drawing) in the axial direction of the armature shaft 125. A first thrust bearing 130 is provided on the bottom side of the bottomed cylindrical portion 121*a*, and a first steel ball 131 is provided between the first thrust bearing 130 and the armature shaft 125.

A second radial bearing 132 is attached to the brush holder 124, and the second radial bearing 132 rotatably supports the other side (right side in the drawing) in the axial direction of the armature shaft 125. In this manner, the first radial bearing 129, the first thrust bearing 130, and the first steel ball 131 are installed on one side in the axial direction of the armature shaft 125, and the second radial bearing 132 is installed on the other side in the axial direction of the armature shaft 125, so that the armature shaft 125 (armatures 123) is smoothly rotatable without generating hardly any rotation resistance.

The gear section 140 has a gear case 141, a connector member 142, and a bottom cover 143. The gear case 141 is formed into a predetermined shape by injection-molding of resin material such as plastic material or the like, and is coupled to the opening of the motor case 121 via the connector member 142.

In the gear case 141, a worm shaft 144 integrally formed with a worm 144*a* on the outer peripheral side, and a worm wheel 145 having a teeth portion 145*a* meshed with the worm 144*a* on the outer peripheral side are accommodated and rotatable. Here, the worm 144*a* is formed into a helical shape, with the teeth portion 145*a* being slanted in the axial direction of the worm wheel 145 with a gentle tilt angle. Therefore, a smooth power transmission from the worm shaft 144 to the worm wheel 145 is available. Here, the worm 144*a* and the worm wheel 145 form a speed reduction mechanism, and constitute a gear mechanism of the present invention.

The worm shaft 144 is axially aligned with armature shaft 125. The same side of the worm shaft 144 as the motor case 121 (left side in the drawing) in the axial direction is coupled to the same side of the armature shaft 125 as the gear case 141 (right side in the drawing) in the axial direction, and power can be transmitted via a coupling member 150. The coupling member 150 has an axis offset absorbing function for absorbing an axis offset between the worm shaft 144 and the armature shaft 125, and even if the axis offset between the shafts 125 and 144 is caused by a dimensional error or the like of each part forming the motor 110 with speed reduction mechanism, the rotation of the armature shaft 125 can be smoothly transmitted to the worm shaft 144.

A second thrust bearing 146 which supports the worm shaft 144 from the axial direction in the gear case 141 is provided on the opposite side of the worm shaft 144 to the motor case 121 in the axial direction, and a second steel ball 147 is provided between this second thrust bearing 146 and the worm shaft 144. The second thrust bearing 146 and the second steel ball 147 are used for smoothly rotating the worm shaft 144. Furthermore, on both sides of the worm 144*a* in the axial direction of the worm shaft 144, a third radial bearing 148 and a fourth radial bearing 149 are provided, and the radial bearings 148 and 149 are secured to the same axis in the gear case 141. Therefore, the worm shaft 144 is smoothly rotatable without generating hardly any rotation resistance.

To the outer peripheral side of the coupling member 150, a ring-shaped sensor magnet 151 is attached and integrally rotatable with it. The sensor magnet 151 is formed of a bond magnet or the like which is formed by joining magnet powder by binder such as resin or the like, and is magnetized so that N-poles and S-poles are alternately arranged along the circumferential direction. On the other hand, in the connector member 142, a sensor circuit board 142*a* is secured, and on an opposite portion of the sensor circuit board 142*a* to the sensor magnet 151, a pair of Hole ICs 142*b* (one in the drawing) are attached.

Each of the Hole ICs 142*b* carries out a switching operation depending on changes of the magnetic poles in accordance with the rotation of the sensor magnet 151, and transmits a switching signal (rectangular wave signal) caused by the switching operation to a controller. The controller detects a length or the like of the rectangular wave signal from the Hole ICs 142*b*, and calculates the rotation speed or the like (rotation state) of the worm shaft 144. When the rotation speed of the worm shaft 144 (worm wheel 145) is lowered, the controller determines that, for example, any obstacle comes in contact with the window glass, and executes a controlling operation to stop or reverse the rotation of the motor 110 with speed reduction mechanism. However, in place of the Hole ICs 142*b*, an MR sensor (magnetic resistance element) may be used.

As shown in FIG. 7, the bottom 141*a* of the gear case 141 is integrally provided with a supporting cylinder 141*b* which is formed into a hollow shape, and which rotatably supports the worm wheel 145, and the supporting cylinder 141*b* protrudes inward the gear case 141. A supporting pin 141*c* which rotatably supports an output member 170 serving as an output shaft penetrates a radially inner side portion of the supporting cylinder 141*b*, the supporting pin 141*c* is secured to it, and a tip side (upper side in the drawing) of the supporting pin 141*c* penetrates the gear case 141 and extends to the outside of the gear case 141.

A dumper member 160 made of elastic member such as rubber, and the output member 170 made of resin material such as plastic material, are attached to the worm wheel 145. The worm wheel 145, the dumper member 160, and the output member 170, with they being integral with each other (prepared as a sub-assy part), are attached from the opening 141*d* of the gear case 141, and their structure makes them easy to assemble.

The dumper member 160 is integrally provided with an elastically deformable portion (not shown), and this elastically deformable portion is sandwiched between a torque output portion 145*b* of the worm wheel 145 and a torque receiving portion 171*a* of the output member 170 along the circumferential direction of the worm wheel 145. With this configuration, when the worm wheel 145 is rotated in a forward/reverse direction, a rotational torque is transmitted to the torque receiving portion 171*a* from the torque output portion 145*b* through the elastically deformable portion. At this time, an impact caused by an abrupt fluctuation or the like of the rotational torque can be alleviated by elastic deformation of the elastically deformable portion.

The output member 170 has a large diameter portion 171 formed into a substantially disc shape, a small diameter portion 172 formed into a substantially cylinder shape, and a serration portion 173 having a diameter smaller than that of the small diameter portion 172, and having a serration 173*a* formed on the outer peripheral side, and they are arranged from the same side as the worm wheel 145. On the same side of the large diameter portion 171 as the worm wheel 145 (lower side in the drawing), the output member 170 is integrally provided with the torque receiving portions 171*a* (for example, three).

The small diameter portion 172 is provided on the opposite side (upper side in the drawing) of the large diameter portion 171 to the torque receiving portions 171*a* along the axial direction of the large diameter portion 171, and a first lip portion 192 of the bottom cover 143 is made in sliding contact with the outer peripheral side of the small diameter portion 172. Here, the bottom cover 143 tightly closes (occludes) the opening 141*d* of the gear case 141 via a second lip portion 193, thereby preventing rainwater, dusts and the like from intruding into the gear case 141.

The serration portion 173 functions as an output unit of the motor 110 with speed reduction mechanism, and a drum (not shown) forming a window regulator is meshed with the serration 173*a* of the serration portion 173. In this manner, the rotation of the worm shaft 144 by the rotation of the armature shaft 125 is decelerated by the worm wheel 145, the output enhanced in torque is transmitted to the drum of the window regulator from the serration portion 173 of the output member 170 via the dumper member 160.

The worm wheel 145 is formed into a bottomed cylindrical shape by injection-molding of resin material such as plastic material or the like. The worm wheel 145 has a small diameter cylindrical portion 145*c* which is pivotably attached to the supporting cylinder 141*b* of the gear case 141; a large diameter cylindrical portion 145*d* having a teeth portion 145*a* on its outer peripheral side; and a bottom portion 145*e* through which the small diameter cylindrical portion 145*c* and the large diameter cylindrical portion 145*d* are coupled to each other. A plurality of torque output portions 145*b* (for example, three), which protrude inward the worm wheel 145, are integrally attached to the bottom portion 145*e*.

As shown in FIGS. 7 to 9B, the bottom cover 143 has a cover main body 180 and a seal member 190.

The cover main body 180 constitutes a gear cover in this invention, and is formed into a ring shape by injection-molding of molten plastic material (molten resin) or the like. The outer peripheral side in the radial direction of the cover main body 180 is integrally provided with a ring-shaped convex portion 181 which protrudes toward one side surface (the same side surface as the gear case 141) of the cover main body 180, and this ring-shaped convex portion 181 is designed to support the second lip portion 193 of the seal member 190 from the inner side in the radial direction of the bottom cover 143.

On the outer peripheral side in the radial direction of the cover main body 180, three first stopping claws 182 and one second stopping claw 183 are provided at regular intervals (intervals of 90 degrees) along the circumferential direction. The stopping claws 182 and 183 (four in total) are respectively engaged with and stopped on four stopping convex portions (not shown) provided in the vicinity of the opening 141*d* of the gear case 141, so that the bottom cover 143 is securely fixed to the gear case 141 so as not to come off.

Here, since the second stopping claw 183 is arranged in the substantially center portion of the gear case 141, and cannot extend in the axial direction of the worm wheel 145, the length of the second stopping claw 183 is set to be shorter than that of each of the first stopping claws 182. Furthermore, a reinforcing convex portion 182*a*, which protrudes toward the outside in the radial direction of the worm wheel 145, is provided at the tip of each of the first stopping claws 182. Each reinforcing convex portion 182*a* is used for preventing a welded portion from occurring in the tip of each first stopping claw 182 at the time of injection-molding of the cover main body 180, so that the tip of each of the first stopping claws is reinforced.

An output shaft hole (through hole) 184 is formed at the center portion of the cover main body 180, and the small diameter portion 172 of the output member 170 is introduced through the output shaft hole 184. That is, the large diameter portion 171 of the output member 170 is disposed in the gear case 141, and the serration portion 173 of the output member 170 is disposed outside the gear case 141. Between the output shaft hole 184 and the small diameter portion 172, a predetermined ring-shaped gap is formed, and in this ring-shaped gap, the first lip portion 192 of the seal member 190 is disposed.

The seal member 190 is formed into a ring shape by injection-molding of molten rubber material (molten rubber) or the like, and has a flat-plate main body 191, a first lip portion 192, and a second lip portion 193. The seal member 190 is integrally formed on one side surface of the cover main body 180 by two-color molding, and the seal member 190 and the cover main body 180 are securely welded with each other so as not to be easily separated from each other.

The thickness of the flat-plate main body 191 is set to be thinner than the thickness dimension of the cover main body 180, and the flat-plate main body 191 covers substantially the entire area of one side surface of the cover main body 180. The first lip portion 192 is integrally provided on the inner peripheral edge (inner side in the radial direction) of the flat-plate main body 191, and the first lip portion 192 has a lip main body 192a extending in the thickness direction of the cover main body 180, and a pair of first lip segments (lip segments) 192b protruding from the lip main body 192a toward the output member 170.

The first lip segments 192b are provided side by side in the axial direction of the output member 170, and formed so as to have flexibility. The tip portion of each of the first lip segments 192b is held in contact with the outer peripheral portion of the small diameter portion 172 while being elastically deformed, thereby preventing rainwater, dusts, and the like from intruding into the gear case 141 through the gap between the small diameter portion 172 and the output shaft hole 184, while ensuring smooth rotation of the output member 170. That is, the first lip portion 192 tightly seals the gap between the cover main body 180 and the output member 170.

The second lip portion 193 is integrally provided on the outer peripheral edge (outer side in the radial direction) of the flat-plate main body 191, and the second lip portion 193 is disposed on the outside in the radial direction of the ring-shaped convex portion 181 provided to the cover main body 180. The second lip portion 193 has a pair of second lip segments (lip segments) 193a protruding toward the opposite side to the output member 170, that is, toward the opening 141d side of the bear case 141.

The second lip segments 193a are provided side by side in the axial direction of the output member 170, and are formed so as to have flexibility. The tip of each of the second lip segments 193a is in contact with the inner peripheral portion of the opening 141d while being elastically deformed, thereby preventing rainwater, dusts, and the like from intruding into the gear case 141 via the gap between the opening 141d and the ring-shaped convex portion 181. That is, the second lip portion 193 tightly seals the gap between the cover main body 180 and the gear case 141.

Furthermore, as shown in FIG. 8B, in the seal member 190, the flat-plate main body 191 covering one side surface of the cover main body 180 is integrally formed with the first lip portion 192 which is disposed on the inner peripheral edge of the output shaft hole 184 of the cover main body 180, and held in sliding contact with the outer peripheral surface of the output member 170, and the flat-plate main body 191 is integrally formed with the second lip portion 193 disposed on the outside in the radial direction of the ring-shaped convex portion 181 of the cover main body 180. Therefore, the boundary of the seal member 190 formed on the cover main body 180 and the cover main body 180 is continuously connected only to the outside of the gear case 141, and not continuously connected to the inside of the gear case 141, so that, even when water such as rainwater or the like intrudes, for example, the boundary between the inner peripheral edge of the output shaft hole 184 of the cover main body 180 and the first lip portion 192 as well as the boundary between the ring-shaped convex portion 181 of the cover main body 180 and the second lip portion 193, it is possible to prevent water from intruding into the gear case 141. Therefore, it is possible to positively prevent water such as rainwater or the like from intruding into the gear case 141.

As shown in FIG. 8B, the flat-plate main body 191 is integrally provided with a gate portion 194 which is formed by supplying molten rubber to one side surface of the cover main body 180 in the vertical direction. The gate portion 194 is provided between the first stopping claws 182 arranged in the circumferential direction of the cover main body 180, near the outside in the radial direction of the flat-plate main body 191. Here, molten rubber flows from the place of the gate portion 194 so as to proceed along one side surface of the cover main body 180 at the time of injection-molding of the seal member 190, and the seal member 190 is integrally formed with the cover main body 180.

An overflow portion 195, which is formed by flowing molten rubber from one side surface of the cover main body 180 toward the other surface thereof at the time of injection-molding of the seal member 190, is integrally provided on the outside in the radial direction from the second lip portion 193 of the seal member 190. The overflow portion 195 extends from one side surface of the cover main body 180 toward the other surface, and the overflow portion 195 is provided on an opposite side of the flat-plate main body 191 to the gate portion 194, and across from the center portion of the flat-plate main body 191. Furthermore, the overflow portion 195 is also extended from the flat-plate main body 191 beyond the second lip portion 193, and disposed on the outermost peripheral portion of the seal member 190, that is, the overflow portion 195 is provided at the most distant position (farthest position) from the gate portion 194.

Here, the opposing portion of the flat-plate main body 191 to the gate portion 194 serves as a collision portion CP (see FIG. 13) at which, at the time of injection-molding of the seal member 190, molten rubber branched at the place of the gate portion 194 flows so as to collide with each other, and the overflow portion 195 is provided so as to correspond to this collision portion CP.

Next, a manufacturing process of the bottom cover 143 of the motor with speed reduction mechanism 110 will be explained in detail with reference to the drawings.

Figure 10A:
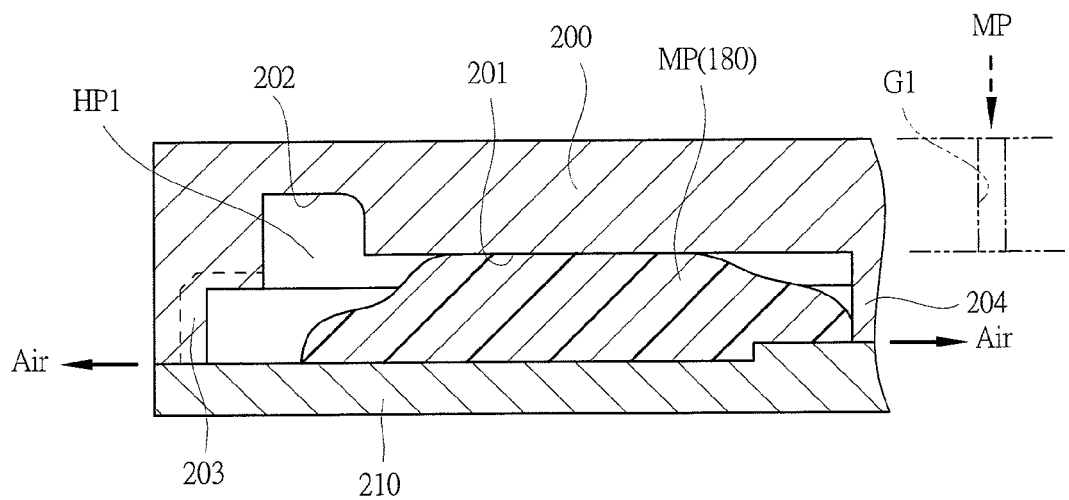
FIGS. 10A and 10B are views explaining a molding process of a cover main body.
Figure 10B:
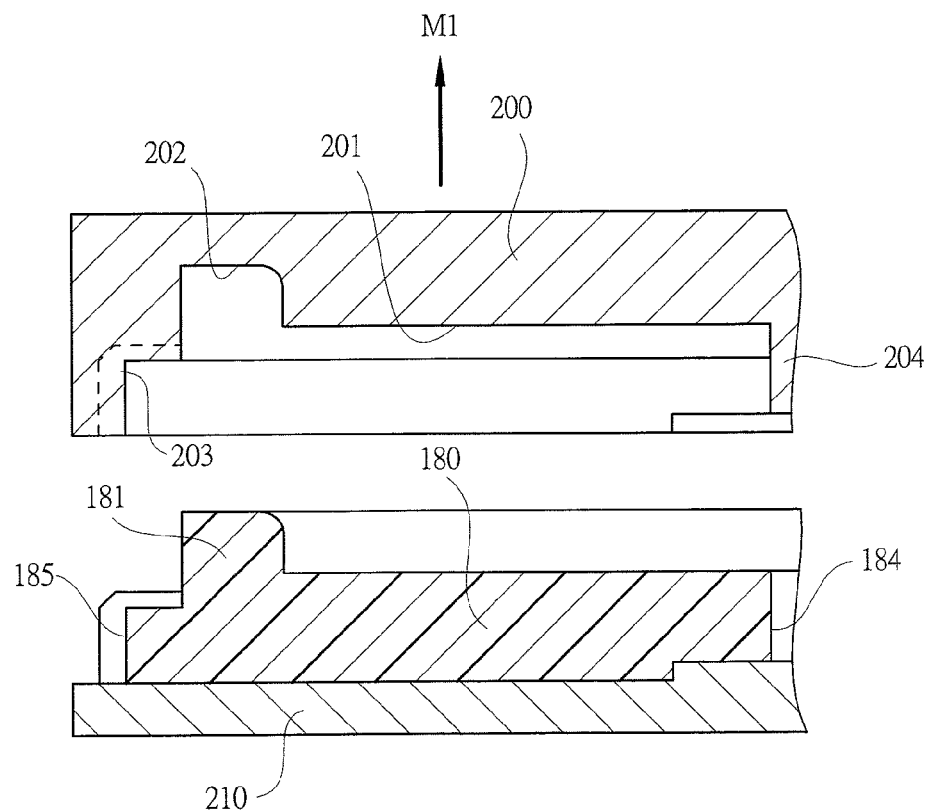
Figure 11A:
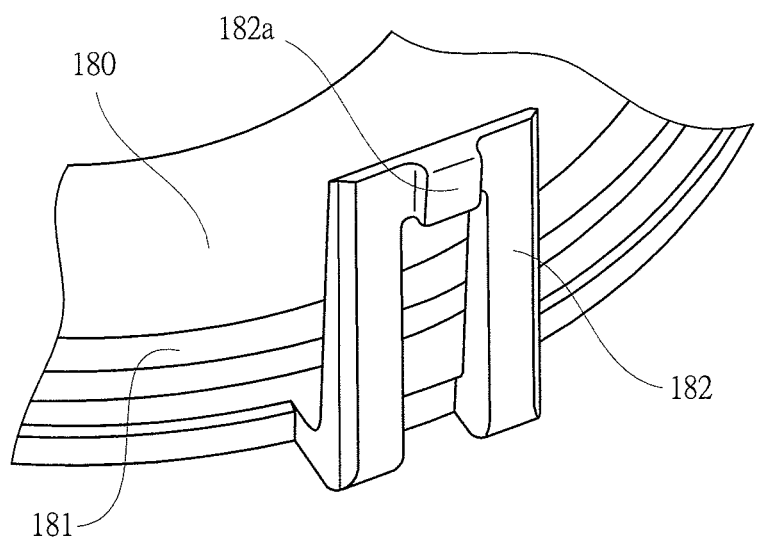
FIGS. 11A and 11B are views explaining a molding state of a first stopper claw of the cover main body.
Figure 11B:
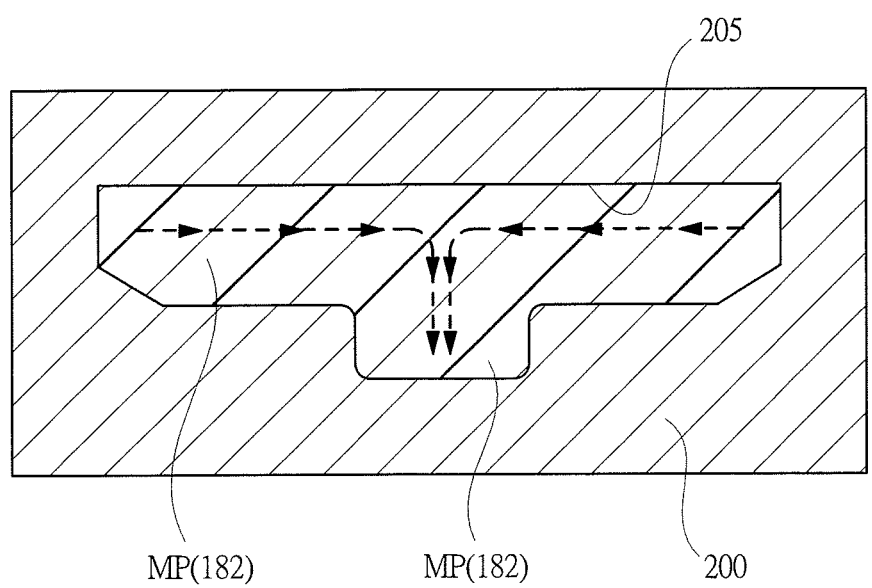
Figure 12A:
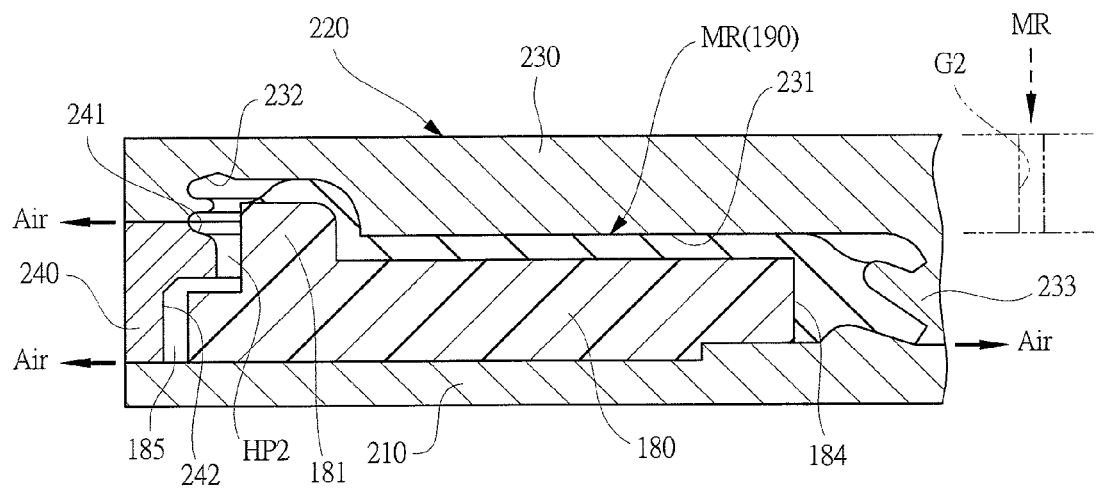
FIGS. 12A and 12B are views explaining a molding process of the seal member.
Figure 12B:
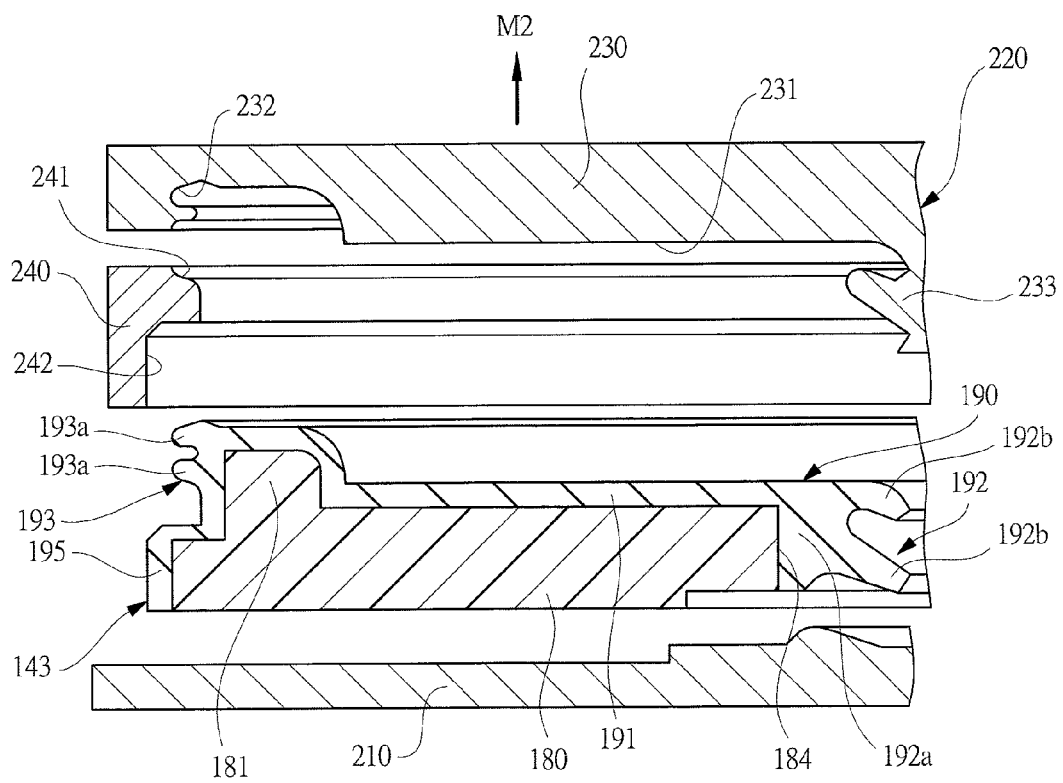
Figure 13A:
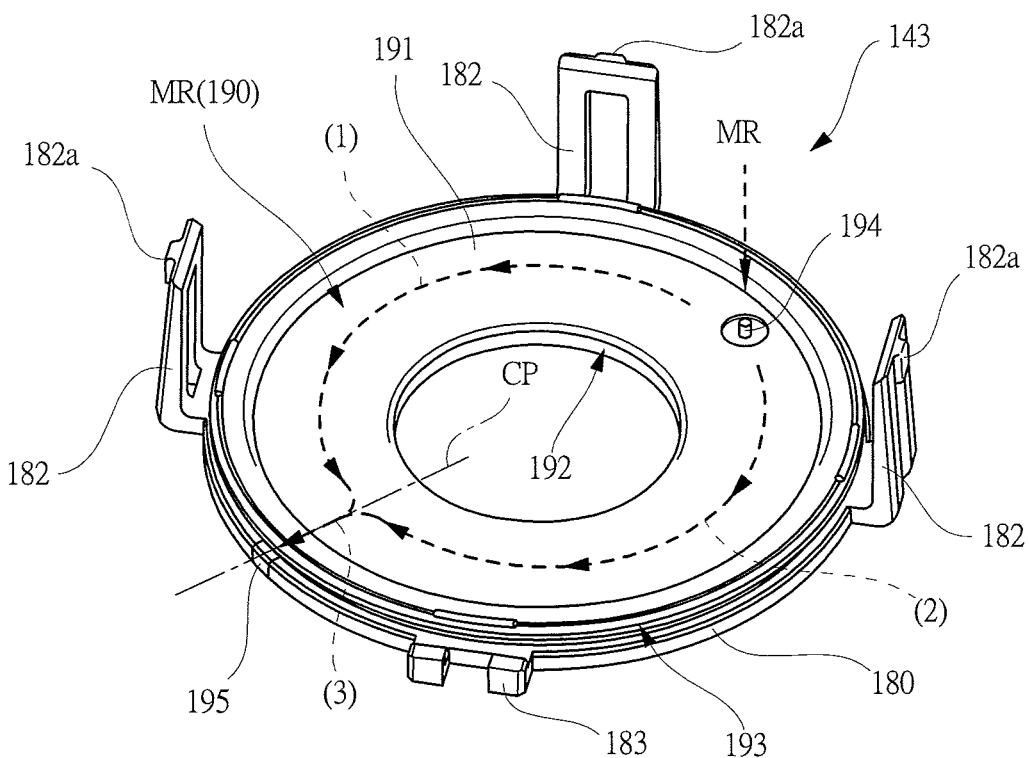
FIGS. 13A and 13B are views explaining how a molten rubber flows.
Figure 13B:
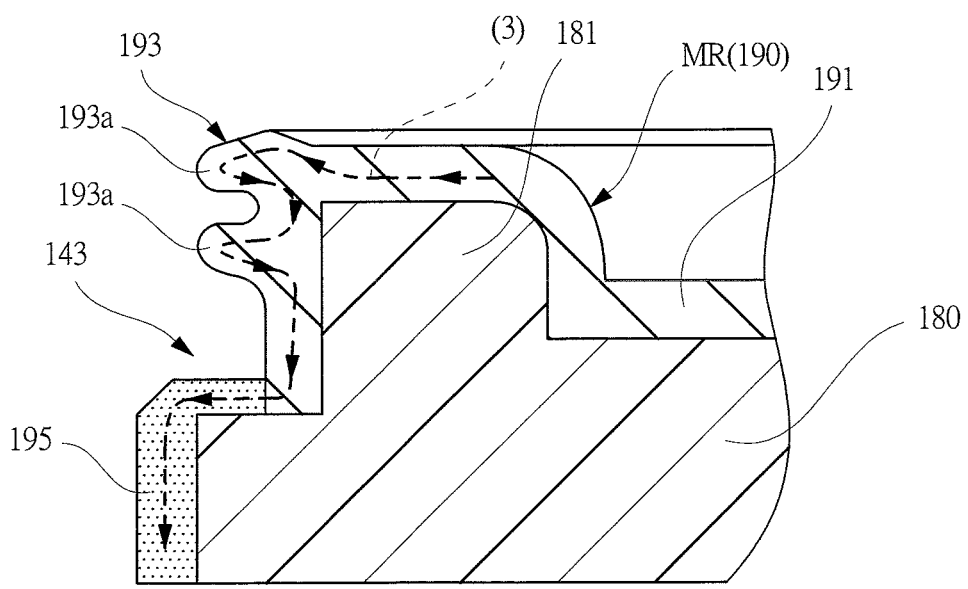

FIGS. 10A and 10B are views explaining a molding process of a cover main body, FIGS. 11A and 11B are views explaining a molding process of a first stopper claw of the cover main body, FIGS. 12A and 12B are views explaining a molding process of the seal member, and FIGS. 13A and 13B are views explaining flow of the molten rubber.

The bottom cover 143 is formed into a predetermined shape by two-color molding of the molten rubber and the molten resin by using three molds. Firstly, three molds will be explained in advance of explanation on the manufacturing process of the bottom cover 143.

As shown in FIG. 10, a first mold 200 is an upper mold which is movable in vertical directions with respect to a second mold 210, and is designed to mold one side surface of the cover main body 180. The first mold 200 has: a first concave portion 201 for molding one side surface of the cover main body 180; and a bottomed second concave portion 202 which is larger in depth than the first concave portion 201, and which is used for molding the ring-shaped convex portion 181.

The first mold 200 has a convex portion 203 for molding the outer peripheral portion of the cover main body 180, and molding a concave portion 185 in the cover main body 180, so that the overflow portion 195 of the seal member 190 is formed by injection of the molten rubber into the concave portion 185. This convex portion 203 is formed into a substantially "L" shape, and extends in radial and axial directions of the first mold 200.

The first mold 200 has a cylinder portion 204 for forming the output shaft hole 184 by molding the output shaft hole 184 of the cover main body 180.

The first mold 200 has four stopping-claw molding holes for forming the stopping claws 182 and 183 by molding the stopping claws 182 and 183 (see FIG. 11B). Here, in FIG. 11B, only a stopping-claw molding hole 205 for molding the first stopping claw 182 is shown in FIG. 11A.

In an opposing portion of the convex portion 203 sandwiching the cylinder portion 204 of the first mold 200, a molten-resin supplying gate G1, which supplies molten resin MP to a hollow portion HP1 formed between the first mold 200 and the second mold 210, is formed.

The second mold 210 is a lower mold which is secured to a base plate (base) or the like of a molding apparatus (two-color molding apparatus), not shown, and is designed to mold the other side surface of the cover main body 180. The second mold 210, which is formed into a substantially flat disc shape, is used for both of a cover main body molding process for molding the cover main body 180 and a seal member molding process for molding the seal member 190.

As shown in FIG. 12, a third mold 220 is an upper mold which is movable in vertical directions with respect to the second mold 210, and is designed to mold one side surface of the seal member 190. The third mold 220 is composed of: a first split mold 230; and a second split mold 240, and the first split mold 230 is provided with: a first concave portion 231 for molding one side surface of the seal member 190; and a bottomed second concave portion 232 which is deeper than that of the first concave portion 231, and designed to mold one of the second lip segments 193a.

The first split mold 230 has a stepped cylinder portion 233 which forms the first lip portion 192 by molding the first lip portion 192 of the seal member 190.

An opposing portion of the concave portion 185 formed in the cover main body 180 sandwiching the stepped cylinder portion 233 of the first split mold 230 is provided with a molten-rubber supplying gate G2 for supplying a molten rubber MR to a hollow portion HP2 formed between the third mold 220 (first split mold 230, second split mold 240) and the second mold 210.

An abutting portion of the second split mold 240 on the first split mold 230 on the outside (left side in the drawing) in the radial direction of the second split mold 240 is provided with a second lip segment molding portion 241 for molding the other of the second lip segments 193a.

A third concave portion 242 which covers the outer peripheral portion of the cover main body 180, and which is used for molding the overflow portion 195 of the seal member 190, is formed on the outside in the radial direction of the second split mold 240, and on the same side as its abutting portion which abuts on the first split mold 230.

Next, a manufacturing process of the bottom cover 143 by the above three molds (the first mold 200, the second mold 210, and the third mold 220) will be explained hereinafter.

First, as shown in FIG. 10A, by driving a driving source (not shown) of the molding apparatus so as to carry out a lowering operation, the first mold 200 is moved so as to come close to the second mold 210 so that the molds 200 and 210 abut on each other. Next, by driving the molten-resin supplying source (not shown) of the molding apparatus, the molten resin MP is supplied from the molten-resin supplying gate G1 of the first mold 200 toward the hollow portion HP1 at a predetermined pressure. Then, the molten resin MP, which forms the cover main body 180, gradually flows into the hollow portion HP1, and flows along its shape to mold the cover main body 180. At this time, air originally located in the hollow portion HP1 is discharged to the outside as indicated by an arrow in the drawing via a fine gap at the abutting portion between the first mold 200 and the second mold 210, thereby spreading the molten resin MP to every corner in the hollow portion HP1, so that the cover main body 180 is molded with high precision (first process).

Next, a molding state of the first stopping claws 182 shown in FIG. 11A will be explained hereinafter. As shown in FIG. 11B, when a molten resin MP flows through the stopping claw molding hole 205, the molten resin MP, which reached a position for molding the reinforcing convex portion 182a in opposing directions, abut against each other at the portion for use in molding the reinforcing convex portion 182a, and are then allowed to flow in the same direction (downward in drawing)(indicated by a broken line in the drawing). For this reason, it is possible to prevent a welded portion from occurring at the tip of each of the first stopping claws 182, thereby making it possible to provide a sufficient strength to each of the first stopping claws 182.

After molding the cover main body 180, as indicated by an arrow M1 in FIG. 10B, by driving the driving source of the molding apparatus so as to raise it, the first mold 200 is separated from the second mold 210. At this time, only the first mold 200 is separated from the cover main body 180 with the cover main body 180 being attached to the second mold 210 (second step). In this manner, the molding process of the cover main body 180 is completed, and gets prepared for transition to the next step.

Next, as shown in FIG. 12A, by driving the driving source of the molding apparatus to carry out a lowering operation, the third mold 220 having the first split mold 230 and the second split mold 240 combined with each other is moved close to the second mold 210 to which the cover main body 180 is attached so that the respective molds 220 and 210 are allowed to abut against each other. Next, by driving the molten-rubber supplying source (not shown) of the molding apparatus, the molten rubber MR is supplied from the molten-rubber supplying gate G2 of the first split mold 230 toward the hollow portion HP2 at a predetermined pressure. Then, the molten rubber MR, which forms the seal member 190 later, is allowed to gradually flow inside the hollow portion HP2 along its shape so that the seal member 190 is fused and deposited inside the hollow portion HP2.

At this time, since the cover main body forming process proceeds to the seal member molding process with the cover main body 180 being held by the second mold 210, it is possible to reduce the deformation due to cooling of the cover main body 180 by the second mold 210, thereby making it possible to improve the molding precision of the cover main body 180. In this manner, the seal member 190 is securely fused and deposited (dichroic molded) on the cover main body 180. Furthermore, air (Air) originally located inside the hollow portion HP2 is discharged outside as indicated by an arrow in the drawing through a fine gap at the abutting portion between the first split mold 230 and the second split mold 240 as well as through a fine gap at the abutting portion between the second split mold 240 (third mold 220) and the second mold 210. Thus, the molten rubber MR is allowed to spread to every corner inside the hollow portion HP2 so that the seal member 190 is molded with high precision, thereby making it possible to complete a bottom cover 143 (third process).

In this case, the molten rubber MR supplied toward the hollow portion HP2 from the molten-rubber supplying gate G2 molds the gate portion 194 as shown in FIG. 13A, and is branched into a first branch flow (1) and a second branch flow (2) on one side surface of the cover main body 180. Then, the branched molten rubbers abut against each other at a collision portion CP located at a portion opposed to the gate portion 194 along the radial direction of the cover main body 180. Thereafter, as shown in FIG. 13B, the molten rubber MR, formed into a joined flow (3), is allowed to flow into the concave portion 185 (see FIG. 12A) of the cover main body 180 together with bubbles or the like generated in the collision portion CP and the second lip portion 193, while molding the second lip portion 193, so that the overflow portion 195, indicated by a half-tone dot meshing portion in the drawing, is formed. Since the overflow portion 195 is a so-called wasteful portion in the seal member 190, bubbles or the like held in the overflow portion 195 do not cause any adverse effects to the sealing performance of the seal member 190.

Furthermore, as shown in FIG. 12, in the second lip segment molding portion 241 formed near the abutting portion against the first split mold 230 of the second split mold 240, the other second lip segment 193a is molded, while in the abutting portion between the second split mold 240 (third mold 220) and the second mold 210, one of the first lip segments 192b is molded. Therefore, it is possible to positively discharge air (Air) located inside the hollow portion HP2 corresponding to the other second lip segment 193a and the one of the first lip segments 192b, and consequently to prevent the first lip portion 192 and the second lip portion 193 from being formed into defective shapes.

After a certain period of cooling time, or after cooling the bottom cover 143 which is cured by using a cooling mechanism (not shown) installed in the molding apparatus, the driving source of the molding apparatus is driven to carry out a raising/lowering operation, as indicated by an arrow M2 in FIG. 12B. In this manner, the third mold 220 (first split mold 230, second split mold 240) is separated from the second mold 210. Then, the bottom cover 143 in which the cover main body 180 and the seal member 190 are integrated as one unit, is taken out of the second mold 210 and the third mold 220 (fourth process).

Additionally, the removal of the bottom cover 143 from the third mold 220 is carried out, with the seal member 190 being elastically deformed, that is, a so-called forceful removal is carried out. Furthermore, the removing job of the bottom cover 143 from the respective molds 210 and 220 is carried out manually by a worker, or by using a removing mechanism (not shown) installed in the molding apparatus.

As described above in detail, in accordance with the motor 110 with speed reduction mechanism relating to the second embodiment, since the seal member 190 is integrally formed on one side surface of the cover main body 180 by using a two-color molding process, a sealing structure can be formed from the bottom cover 143 having the seal member 190 and the cover main body 180 (two members in total) so that a simple process can be achieved by eliminating assembling jobs. Furthermore, the seal member 190 is formed by using a ring-shaped flat-plate main body 191, a first lip portion 192 formed on the inner peripheral edge of the flat-plate main body 191 so as to tightly seal the gap between the cover main body 180 and the small-diameter portion 172, and a second lip portion 193 formed on the outer peripheral edge of the flat-plate main body 191 so as to tightly seal the gap between the cover main body 180 and the gear case 141, and a gate portion 194, which is formed by supplying molten rubber onto one side surface of the cover main body 180 in the vertical direction, is installed on the flat-plate main body 191, with an overflow portion 195 which extends from the one side surface of the cover main body 180 toward the other side surface being installed at a collision portion CP at which molten rubbers MR collide with each other of the flat-plate main body 191. Therefore, at the collision portion CP at which the molten rubbers MR collide with each other, the molten rubber MR can be directed to the other side surface of the cover main body 180 beyond the second lip portion 193. Thus, it is possible to suppress a welded portion from occurring at the collision portion CP of the molten rubbers MR on the periphery of the second lip portion 193, and consequently to improve sealing performance of the seal member 190.

Furthermore, in accordance with the motor 110 with speed reduction mechanism in accordance with the second embodiment, since the first lip portion 192 and the second lip portion 193 are formed by respective lip segments 192b and 193a placed side by side on two stages in the axial direction of the output member 170, even when a welded portion occurs on the periphery of each of the lip portions 192 and 193, a normal lip segment without having the welded portion of the lip segments 192b and 193a makes it possible to prevent a defective sealing state.

Furthermore, in accordance with the method for manufacturing the motor 110 with speed reduction mechanism relating to the second embodiment, in the third process, since the cover main body 180 formed in the first process is not removed from the second mold 210 and is kept in the attached state thereto, it is possible to simplify the molding process. Since the cover main body 180 is kept in a state held by the second mold 210 from the first step to the third step, it is possible to regulate the deformation of the cover main body 180 due to cooling by using the second mold 210, and consequently to improve the molding precision of the cover main body 180. Thus, in the third process, the cover main body 180 and the seal member 190 can be fused and deposited with sufficient strength so that the molding precision is improved and the occurrence of deviations can be suppressed.

Furthermore, in accordance with the method for manufacturing the motor 110 with speed reduction mechanism relating to the second embodiment, since the first lip portion 192 is molded by using an abutting portion between the second mold 210 and the second split mold 240 (third mold 220), air (Air) located inside the hollow portion can be discharged outside from the abutting portion between the second mold 210 and the second split mold 240, and the first lip portion 192 is prevented from being formed into a defective shape, so that the first lip portion 192 can be molded with high precision.

Furthermore, in accordance with the method for manufacturing the motor 110 with speed reduction mechanism relating to the second embodiment, since the third mold 220 is formed from the first split mold 230 and the second split mold 240, and since the second lip portion 193 is molded by using an abutting portion between the first split mold 230 and the second split mold 240, air (Air) located inside the hollow portion can be discharged outside from the abutting portion between the first split mold 230 and the second split mold 240, and the second lip portion 193 is prevented from being formed into a defective shape, so that the second lip portion 193 can be molded with high precision.

Next, the third embodiment of the present invention will be explained with reference to the accompanying drawings. Here, parts the same in function as each other are basically denoted by the same reference symbols, and repetitive explanation thereof will be omitted.

Figure 14:
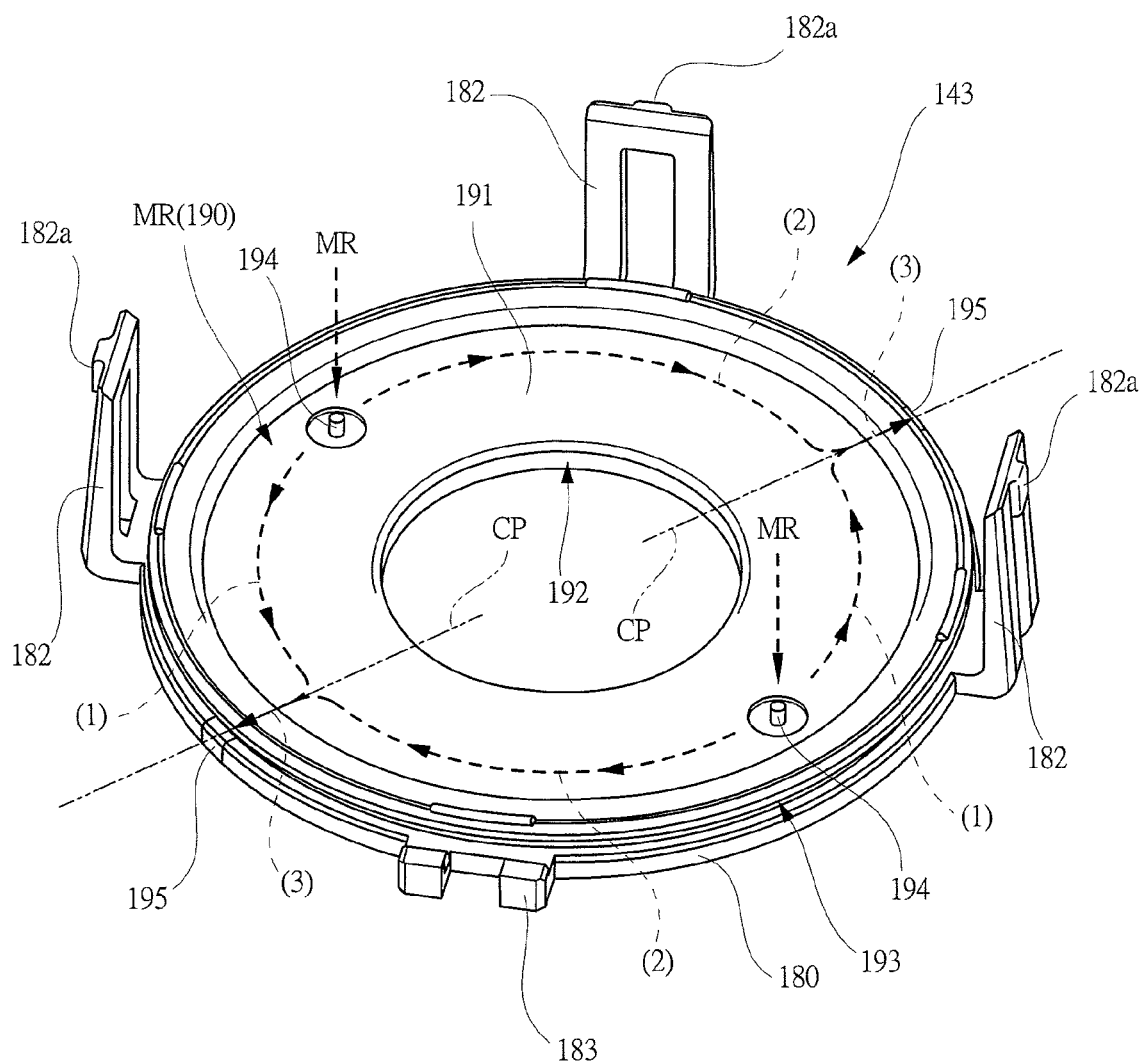
FIG. 14 is a perspective view showing a bottom cover according to the third embodiment of the present invention.

FIG. 14 is a perspective view showing a bottom cover according to the third embodiment of the present invention.

The third embodiment is different from the other embodiments in that, as shown in FIG. 14, two gate portions 194 each of which is formed by supplying molten rubber MR onto one side surface of the cover main body 180 in the vertical direction are formed on the flat-plate main body 191 of the seal member 190 for forming the bottom cover 143, and in that a pair of overflow portions 195 are formed at the most departed position (farthest position) from each of the gate portions 194.

The respective gate portions 194 are disposed with intervals of 180 degrees, so as to be opposed to each other with the center portion of the cover main body 180 sandwiched in between, and is also placed between the respective stopping claws 182 and 183 located along the circumferential direction of the cover main body 180 near the outside in the radial direction of the flat-plate main body 191. Furthermore, the respective overflow portions 195 are disposed with intervals of 180 degrees, so as to be opposed to each other with the center portion of the cover main body 180 sandwiched in between, and is also placed on the outermost peripheral portion of the seal member 190 from the flat-plate main body 191 beyond the second lip portion 193. The respective gate portions 194 and the respective overflow portions 195 are disposed at positions with phase shifts of 90 degrees centered on the cover main body 180; thus, the overflow portions 195 are disposed at positions farthest from the respective gate portions 194.

With respect to the flows of the molten rubber MR, in the same manner as in the second embodiment, from the respective gate portions 194, respective branch flows (1) and (2) are formed and allowed to flow. Thereafter, the respective branch flows (1) and (2) are formed into a joined flow (3) at the respective collision portions CP, and form the respective overflow portions 195.

In the third embodiment having the structure described above as well, the same functions and effects as those of the second embodiment can be obtained. In addition, in accordance with the third embodiment, since the molten rubbers MR are supplied from two portions toward the one surface side of the cover main body 180, it is possible to shorten the molding time of the bottom cover 143. However, in order to further shorten the molding time of the bottom cover 143, three or more gate portions 194 may be formed. In this case, overflow portions 195 are formed in association with collision portions CP three or more of which are formed.

Although the present invention accomplished by the present inventor is explained in detail on the basis of the above embodiments, the present invention is not limited to the above embodiments, and it goes without saying that various modifications can be made without departing from the gist thereof.

For example, in the above embodiments, the motor apparatus of the present invention is applied to a power-window motor 11 and a motor 110 with speed reduction mechanism for use as a driving source for a power-window device for a vehicle; however, not limited to this, the present invention may be applied to another motor apparatus, such as, for example, a wiper motor for use as a driving source for a wiper device, a sunroof motor for use as a driving source for a sunroof device, and the like.

Furthermore, in the above embodiments, an electric motor with brush is adopted as a motor main body 12 and a motor section 120; however, not limited to this, for example, a brushless electric motor or the like may be adopted.

Furthermore, in the above embodiments, a two-stage lip structure is exemplified as a structure including the lip 41b1, the first lip portion 192 and the second lip portion 193; however, not limited to this, only the second lip portion 193 to be installed near the overflow portion 195, that is, only the portion which is easily susceptible to an occurrence of a welded portion (the portion farther from the gate portion 194), may have the two-stage lip structure.

Furthermore, in the above embodiments, a two-stage lip structure is exemplified as a structure including the lip 41b1, the first lip portion 192 and the second lip portion 193; however, not limited to this, the present invention may adopt a one-stage lip structure or three-stage or more lip structure may be adopted.

The present invention can be used for manufacturing a motor apparatus such as power-window motor and wiper motor.

While the present invention has been illustrated and described with respect to a particular embodiment thereof, it should be appreciated by those of ordinary skill in the art that various modifications to this invention may be made without departing from the spirit and scope of the present.

What is claimed is:

1. A motor apparatus which is formed by coupling a motor case having a rotational shaft housed therein and a gear case having a gear mechanism housed therein with each other, the motor apparatus comprising:
   a gear cover which occludes an opening of the gear case, the gear cover having a center portion formed with a through hole, an output shaft being introduced through the through hole; and
   a seal member which is provided on one side surface of the gear cover,
   wherein the seal member has:
   a flat-plate main body which covers one side surface of the gear cover,
   a first lip portion which is provided to an inner peripheral edge of the flat-plate main body so as to tightly seal a gap between the gear cover and the output shaft, and
   a second lip portion which is provided to an outer peripheral edge of the flat-plate main body so as to tightly seal a gap between the gear cover and the gear case,
   wherein
   the gear cover is integrally provided with the seal member by a two-color molding,
   the flat-plate main body is integrally provided with a gate portion which is formed by supplying molten rubber to one side surface of the gear cover in a vertical direction, and
   an overflow portion, which extends from one side surface of the gear cover to the other side surface of the gear cover, is provided at a collision area of the flat-plate main body, at which flows of molten rubber collide to each other.

2. The motor apparatus according to claim 1, wherein at least one of the first lip portion and the second lip portion is formed by multistory lip segments aligned in an axial direction of the output shaft.

3. The motor apparatus according to claim 1, wherein the seal member has an anchor portion which is stopped on the other side surface of the gear cover via a mounting hole of the gear cover.

4. The motor apparatus according to claim 2, wherein the seal member has an anchor portion which is stopped on the other side surface of the gear cover via a mounting hole of the gear cover.

5. The motor apparatus according to claim 1, wherein the gear cover has a stopping claw for securing the gear cover to the gear case.

6. The motor apparatus according to claim 2, wherein the gear cover has a stopping claw for securing the gear cover to the gear case.

7. The motor apparatus according to claim 3, wherein the gear cover has a stopping claw for securing the gear cover to the gear case.

* * * * *